United States Patent
Dhuler et al.

(12)

(10) Patent No.: US 6,428,173 B1
(45) Date of Patent: Aug. 6, 2002

(54) MOVEABLE MICROELECTROMECHANICAL MIRROR STRUCTURES AND ASSOCIATED METHODS

(75) Inventors: Vijayakumar R. Dhuler, Raleigh; Mark David Walters, Durham; Edward A. Hill, Chapel Hill; Allen Bruce Cowen, Cary, all of NC (US)

(73) Assignee: JDS Uniphase, Inc., San Jose, CA (US)

( * ) Notice: Subject to any disclaimer, the term of this patent is extended or adjusted under 35 U.S.C. 154(b) by 0 days.

(21) Appl. No.: 09/304,301

(22) Filed: May 3, 1999

(51) Int. Cl.[7] .......................... G02B 5/08; G02B 7/182; G02B 26/08

(52) U.S. Cl. .................. 359/872; 359/881; 359/223; 359/224; 359/230

(58) Field of Search ................................ 359/198, 212, 359/223, 224, 230, 850, 855, 872, 881

(56) References Cited

U.S. PATENT DOCUMENTS

| | | | |
|---|---|---|---|
| 5,909,078 A | * | 6/1999 | Wood et al. |
| 5,914,801 A | * | 6/1999 | Dhuler et al. |
| 5,955,817 A | * | 9/1999 | Dhuler et al. |
| 5,994,816 A | * | 11/1999 | Dhuler et al. |
| 6,211,598 B1 | * | 4/2001 | Dhuler et al. |
| 6,218,762 B1 | * | 4/2001 | Hill et al. |
| 6,236,139 B1 | * | 5/2001 | Hill et al. |
| 6,275,320 B1 | * | 8/2001 | Dhuler et al. |

FOREIGN PATENT DOCUMENTS

| | | |
|---|---|---|
| JP | 01113543 | 5/1993 |
| WO | WO 99/16096 | 4/1999 |

OTHER PUBLICATIONS

International Search Report, PCT/US00/08903, Aug. 14, 2000.

Kohl et al., *Linear Microactuators Based on the Shape Memory Effect*, Sensors and Actuators A, 70, 1998, pp. 104–111.

(List continued on next page.)

*Primary Examiner*—Ricky D. Shafer
(74) *Attorney, Agent, or Firm*—Myers Bigel Sibley & Sajovec

(57) ABSTRACT

Microelectromechanical structures (MEMS) are provided that are adapted to controllably move mirrors in response to selective thermal actuation. In one embodiment, the MEMS moveable mirror structure includes a thermally actuated microactuator adapted to controllably move along a predetermined path substantially parallel to the first major surface of an underlying microelectronic substrate. A mirror is adapted to move accordingly with the microactuator between a non-actuated and an actuated position. In all positions, the mirror has a mirrored surface disposed out of plane relative to the first major surface of the microelectronic substrate. The microactuator provided herein can include various thermal arched beam actuators, thermally actuated composite beam actuators, arrayed actuators, and combinations thereof. The MEMS moveable mirror structure can also include a mechanical latch and/or an electrostatic latch for controllably clamping the mirror in position. A MEMS moveable mirror array is also provided which permits individualized control of each individual MEMS moveable mirror structure within the array. The MEMS moveable mirror structures and the associated arrays can be used in a variety of applications including applications involving the controlled redirection of electromagnetic radiation. Accordingly, a method of redirecting electromagnetic radiation is provided. A method of fabricating MEMS moveable mirror structures is further provided.

10 Claims, 9 Drawing Sheets

OTHER PUBLICATIONS

Lee et al., *Surface–Micromachined Free–Space Fiber Optical Switches With Integrated Microactuators for Optical Fiber Communication Systems*, Transduces '97, 1997 International Conference on Solid–State Sensors and Actuators, Chicago, Jun. 16–19, 1997 pp. 85–88.

Butler et al., *Scanning and Rotating Micromirrors Using Thermal Actuators*, Proceedings of the SPIE, vol. 3131, Jul. 1997, pp. 134–144.

Noworolski et al., *Process for In–Plane and Out–of–Plane Single–Crystal–Silicon Thermal Microactuators*, Sensors and Actuators A, 55, 1996, pp. 65–69.

Uenishi et al., *Micro–Opto–Mechanical Devices Fabricated by Anisotropic Etching of* (110) *Silicon*, IEEE Proceedings of the Workshop on Micro Electro Mechanical Systems (MEMS), 1994, pp. 319–324.

Riza, *Micromechanical Fiber–Optic Switches for Optical Networks*, SPIE, Proceedings of the Conference on Integrated Optics and Microstructures, 1992, pp. 108–126.

* cited by examiner

Single Beam TAB Actuator

Multiple Beam TAB Actuator

Conducting TAB Beams

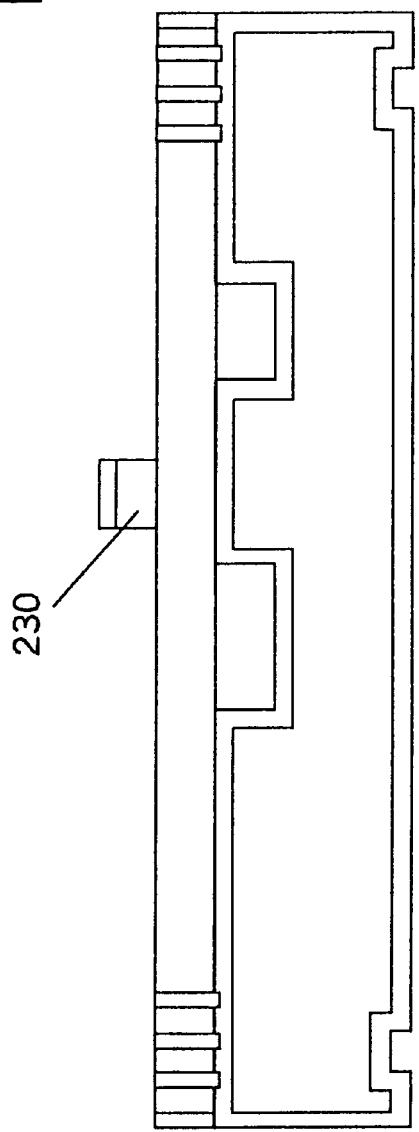
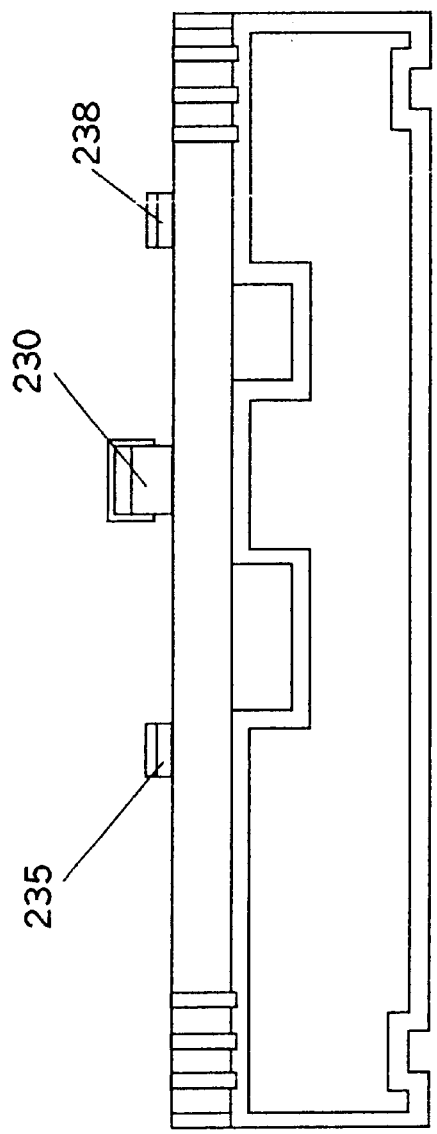

MOVEABLE MICROELECTROMECHANICAL MIRROR STRUCTURES AND ASSOCIATED METHODS

FIELD OF THE INVENTION

The present invention relates to microelectromechanical structures, and more particularly to thermally actuated microelectromechanical mirror structures and associated methods.

BACKGROUND OF THE INVENTION

Microelectromechanical structures (MEMS) and other microengineered devices are presently being developed for a wide variety of applications in view of the size, cost and reliability advantages provided by these devices. Many different varieties of MEMS devices have been created, including microgears, micromotors, and other micromachined devices that are capable of motion or applying force. These MEMS devices can be employed in a variety of applications including hydraulic applications in which MEMS pumps or valves are utilized and optical applications which include MEMS light valves and shutters.

MEMS devices have relied upon various techniques to provide the force necessary to cause the desired motion within these microstructures. Some MEMS devices are driven by electromagnetic fields, while other micromachined structures are activated by piezoelectric or electrostatic forces. Recently, MEMS devices that are actuated by the controlled thermal expansion of an actuator or other MEMS component have been developed. For example, U.S. patent application Ser. Nos. 08/767,192; 08/936,598, and 08/965,277 which are assigned to MCNC, the assignee of the present invention, describe various types of thermally actuated MEMS devices. The contents of each of these applications are hereby incorporated by reference herein. Thermal actuators as described in these applications comprise arched beams formed from silicon or metallic materials that further arch or otherwise deflect when heated, thereby creating motive force. These applications also describe various types of direct and indirect heating mechanisms for heating the beams to cause further arching. While the thermally-actuated MEMS devices of these applications are described in conjunction with a variety of MEMS structures, such as MEMS relays, valves and the like, these applications do not describe thermally-actuated mirror assemblies.

However, MEMS devices including moveable mirror structures have been developed. Commonly, MEMS moveable mirror devices have been used to redirect electromagnetic energy traveling along a path, typically a light or laser beam. For instance, U.S. patent application Ser. No. 08/719,711, also assigned to MCNC and incorporated by reference herein, describes various types of MEMS devices which can rotate a reflective plate about several axes within a framed structure. While these devices can be used for communications, laser printing, or various other applications, these do not provide laterally moveable mirrors.

Lucas NovaSensor of Fremont, Calif. has also developed a variety of MEMS devices including thermally actuated mirror structures. For example, these mirror structures include a matrix addressable thermally actuated mirror suitable for use in an optical switching array. These mirror structures generally include silicon beams connected to the mirror that conduct electrical current and are deflected by the resulting heat in order to position the mirror. In some of the mirror structures, the mirror is conductive and forms part of the electrical heating circuit. Regardless of the manner in which the structures are actuated, the reflective surfaces of the mirrors are disposed in a plane parallel to the underlying substrate when the device is not actuated and can be moved either in plane or out of plane upon thermal actuation.

While some thermally activated MEMS mirror structures have been developed, it would still be advantageous to develop other types of moveable mirror structures that would be suitable for a wider variety of applications. For instance, moveable mirror structures that have mirrors disposed out of plane relative to both the underlying substrate and the direction of movement provided by the actuator are needed. Further, it would be advantageous to provide a MEMS moveable mirror device that could precisely position a mirror and reliably hold the mirror in position, even after the thermal energy used to position the mirror is removed. The efficiency and performance of MEMS mirror devices in applications involving the precise deflection of multiple narrow beams of electromagnetic radiation could thus be improved. For example, high resolution optical switching arrays could be developed from MEMS mirror devices providing these advantageous attributes.

SUMMARY OF THE INVENTION

The present invention provides several embodiments of a moveable microelectromechanical mirror structure that collectively satisfy the above needs and provide several advantageous features. According to the present invention, the moveable MEMS mirror structure includes a thermal actuator and a mirror having a mirrored surface that is disposed out of plane relative to the thermal actuator and to the underlying microelectronic substrate. The MEMS mirror structure provides precise movement of the mirror using the thermal actuator and permits the mirror to be held in a fixed position, even after the thermal actuator is deactivated. Further, MEMS moveable mirror structures may be disposed in an array and individually controlled to serve a variety of switching applications or the like.

In one embodiment, the MEMS moveable mirror structure includes a microelectronic substrate having a first major surface, a microactuator, and a mirror. The microactuator is preferably formed from a single crystal material and is disposed upon the first major surface of the microelectronic substrate. The microactuator is thermally actuated so as to controllably move along a predetermined path that extends substantially parallel to the first major surface of the microelectronic substrate. The mirror is also preferably formed from the single crystal material and is adapted for movement with said microactuator. In particular, the mirror is arranged to move with the microactuator in response to thermal actuation, thus having a non-actuated position and an actuated position. The actuated position can vary accordingly as the microactuator moves along the predetermined path in response to thermal actuation. According to the present invention, the mirror has a mirrored surface disposed out of plane relative to the first major surface of the microelectronic substrate whether in the non-actuated or actuated position.

In one embodiment, the microactuator of the MEMS moveable mirror structure comprises a thermal arched beam actuator. This actuator includes at least two anchors affixed to the microelectronic substrate and at least one thermal arched beam disposed between the anchors. Each thermal arched beam is adapted to arch further and controllably move along the predetermined path in response to the selective application of thermal actuation. The microactuator can optionally include a spring adapted to flex during selective thermal actuation. While the thermal arched beam actuator need only have a single arched beam, the microactuator of the MEMS moveable mirror structure can comprise a plurality of thermal arched beams. In one embodiment, for example, the plurality of thermal arched beams are arrayed to expand in response to thermal actuation and collectively move along the predetermined path. In another embodiment, the plurality of thermal arched beams are arrayed to compress in response to thermal actuation and collectively move along the predetermined path. In any embodiment, the thermal arched beam actuator can include an electrically conductive path disposed through or upon at least part of the thermal arched beams in order to direct the current flow and correspondingly control the heating of the thermal arched beams.

In another embodiment, the microactuator of the MEMS moveable mirror structure comprises at least one thermally actuated composite beam actuator. This actuator includes at least one anchor affixed to the microelectronic substrate and a composite beam extending from the anchor and overlying the first major surface thereof. Each composite beam has a proximal end connected to an anchor, and a distal end adapted to bend so as to move the mirror along the predetermined path in response to selective thermal actuation, as before. Each composite beam also comprises at least two layers that respond or expand differently to thermal actuation. The first and second layers may be formed from materials with different thermal coefficients of expansion, such that the distal end bends toward the layer having the lower thermal coefficient of expansion when thermally actuated. An electrically conductive path encompassing the distal end of the composite beam and having variable electrical resistance is defined by the first and second layers of the composite beam, such that current passing along the conductive path causes thermal actuation of the composite beam. Dual thermally actuated composite beam actuator structures with enhanced linear displacement characteristics are provided, including advantageous interconnecting members, interconnecting structures, and platforms used therewith to carry and correspondingly move the mirror.

One embodiment of the MEMS moveable mirror structure further comprises a mechanical latch affixed to the first major surface of the microelectronic substrate. The mechanical latch is adapted to open in response to thermal actuation so as to receive the microactuator. Further, the mechanical latch is adapted to close when thermal actuation is removed to controllably clamp the microactuator in position once the mirror has moved into the actuated position. Once latched, the microactuator and, therefore, the mirror can be held in place even if the microactuator is no longer actuated. In addition, the mechanical latch is adapted to reopen in response to further thermal actuation to release the microactuator. In another embodiment, an electrostatic latch is provided to clamp the microactuator in position. The electrostatic latch includes an actuator electrode disposed on the microactuator and a substrate electrode disposed on the microelectronic substrate. When a voltage is applied between the electrodes, an electrostatic force is created therebetween to controllably clamp the microactuator in position at any position along the predetermined path of movement.

A further embodiment of the present invention provides a MEMS mirror array including a microelectronic substrate and a plurality of microelectromechanical mirror structures. Each mirror structure comprises a microactuator and mirror as described in the earlier embodiments. One or more of the mirrors within the array can therefore be controllably positioned by selectively thermally actuating the microactuators corresponding to the respective mirrors. For example, the MEMS mirror array can further include an activation matrix having a row activation path and a column activation path operably connected to each moveable mirror structure within the array. Each mirror can thus be controllably positioned through thermal actuation of the respective microactuator by activating the row and column activation paths corresponding to the mirror. As described above, the MEMS mirror array can include a variety of microactuators as well as a spring and a latch, such as a mechanical latch or an electrostatic latch. The MEMS mirror array can also include a source of electromagnetic radiation directed along at least one path intersecting one or more of the mirrors within the array, such that the electromagnetic radiation is redirected by a mirror.

Consequently, the present invention also provides a method of redirecting electromagnetic radiation directed along at least one path using one or more moveable mirror structures. One embodiment of the method comprises the steps of providing at least one source of electromagnetic radiation directed along at least one path, selectively thermally actuating one or more microactuators to controllably move along the predetermined path, controllably moving the mirrors corresponding to the actuated microactuators so as to intersect at least one path of electromagnetic radiation, and redirecting at least one path of electromagnetic radiation intersected by the mirrors. As described above, the mirrors can be clamped in position using the mechanical or electrostatic latches in order to reduce energy consumption.

A method of fabricating an microelectromechanical mirror structure is also provided by the present invention. One embodiment of the method includes the steps of providing a carrier wafer having a first major surface, bonding a single crystal wafer thereto, selectively etching the single crystal wafer to define a mirror having a mirrored surface disposed out of plane relative to the first major surface of the carrier wafer in both actuated and non-actuated positions, and further selectively etching the single crystal material to define a microactuator integral with the mirror. The microactuator is formed with portions released from the carrier wafer so that thermal actuation of the microactuator along the predetermined path parallel to the first major surface of the carrier material will correspondingly move the mirror between the nonactuated and actuated positions. Other embodiments further define the fabrication of the mirror, microactuator, and latches as disclosed herewith.

Although the foregoing invention will be described in some detail, it will be obvious that certain changes and modifications may be practiced within the scope of the invention described herein.

BRIEF DESCRIPTION OF THE FIGURES

FIGS. 10(a) through 10(f) provide sequential side views illustrating various stages during the fabrication process of a moveable MEMS mirror structure according to one embodiment of the present invention.

DETAILED DESCRIPTION OF THE INVENTION

Figure 1:
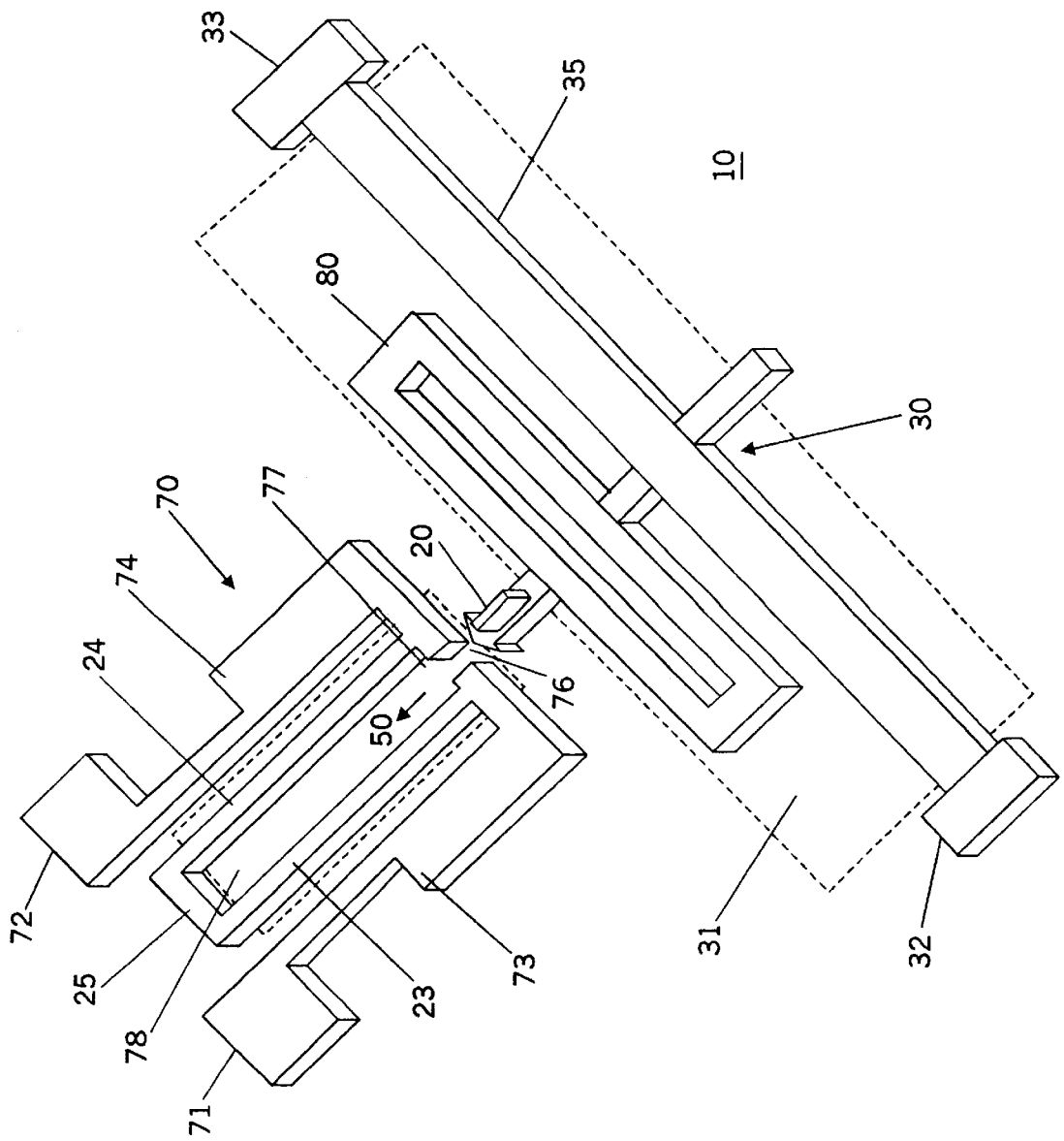
FIG. 1 provides a top perspective view of a moveable MEMS mirror structure and mechanical latch according to one embodiment of the present invention.

The present invention will now be described more fully hereinafter with reference to the accompanying drawings, in which preferred embodiments of the present invention are shown. The present invention may, however, be embodied in many different forms and should not be construed as limited to the embodiments set forth herein; rather, these embodiments are provided so that this disclosure will be thorough and complete, and will fully convey the scope of the present invention to those skilled in the art. Features in the drawings are not necessarily to scale, but merely serve to illustrate the present invention. Like numbers refer to like elements throughout.

The present invention provides a moveable MEMS mirror structure including a thermal actuator and a mirror having a mirrored surface positioned out of plane relative to the underlying microelectronic substrate surface in both non-actuated and actuated positions. The MEMS mirror structure provides very controllable movement of the mirror using the thermal actuator. The MEMS mirror structure can also include various latching mechanisms that can be used to hold the mirror in a fixed position, even after the thermal actuator is deactivated. Further, MEMS moveable mirror structures may be disposed in an array and individually controlled to serve various high resolution applications, such as optical switching, optical attenuation, or the like. As those skilled in the art will appreciate, however, the MEMS moveable mirror structures provided by the present invention may be used advantageously in other applications.

Moveable MEMS Mirror Structure

A moveable microelectromechanical mirror structure according to one embodiment of the present invention is shown by a top perspective view in FIG. 1. One embodiment of the microelectromechanical mirror structure comprises a microelectronic substrate, a microactuator, and a mirror. The microelectronic substrate 10 has a first major surface and serves as a base underlying the MEMS mirror structure. Preferably, the microelectronic substrate used for the present invention comprises a suitable substrate material, such as silicon. For instance, 110 silicon material is particularly advantageous for forming mirror structures. However, other suitable substrate materials may be used, such as glass. Although the microactuator and mirror structures are also preferably formed from a single crystal material, alternatively these structures may be formed from a metallic material, such as nickel. For instance, U.S. patent application Ser. No. 08/736,598, incorporated by reference above, describes a nickel electroplating process that may alternatively be used to form these structures upon the substrate.

In any case, the microactuator 30 is disposed on the first major surface of the single crystal material and adapted to move in response to thermal actuation. As such, the microactuator is adapted to controllably move along a predetermined path that extends substantially parallel to the first major surface of the underlying microelectronic substrate in response to thermal actuation. Preferably, a trench 31 is formed in the substrate underlying at least a portion of the microactuator, so as to provide thermal isolation and minimize heating losses to the microelectronic substrate. As will be discussed below, various thermally actuated structures can serve as the microactuator and function to move and position the mirror.

The mirror 20 of the microelectromechanical mirror structure is adapted for movement with the microactuator. In this regard, while the microactuator and the mirror can be coupled or connected in a variety of manners, the microactuator and the mirror are preferably formed integrally, such as from the single crystal material, for example 110 silicon. The mirror has at least one mirrored surface, which may be formed from etching the single crystal material, depositing a reflective material such as a metal, or both, as described below. Etching the single crystal material along a crystal plane is preferred because an atomically smooth surface may be formed. Regardless of the manner in which the mirrored surface is formed, the mirrored surface is disposed out of plane relative to the first major surface of the microelectronic substrate.

As mentioned above, the mirror is adapted for controlled movement with the microactuator. When the microactuator is not thermally actuated, the mirror is in a non-actuated or rest position. As the microactuator is thermally actuated and is caused to controllably move along the predetermined path, the mirror is correspondingly moved to an actuated position. Those skilled in the art will understand that the mirror can assume an infinite number of actuated positions depending upon the extent of thermal actuation of the microactuator and the corresponding position along the predetermined path to which the microactuator and mirror have moved. In either the non-actuated or actuated positions, however, the mirrored surface of the mirror is disposed out of plane relative to the first major surface of the of the microelectronic substrate.

While microactuators according to the present invention can have many different embodiments, microactuators preferably comprise thermal arched beam (TAB) actuators, such as described by U.S. patent application Ser. No. 08/767,192, the contents of which have been incorporated by reference herein. In this regard, the microactuator of FIG. 1 is a thermal arched beam actuator. The thermal arched beam actuator comprises at least two anchors, for example anchor 32 and anchor 33. Each anchor is affixed to the microelectronic substrate to provide support for the thermal arched beam actuator. Further, the thermal arched beam actuator includes at least one arched beam 35 disposed between at least one pair of anchors. Each arched beam extends between a pair of anchors such that the ends of the arched beam are affixed thereto and the arched beam is held in place overlying the microelectronic substrate.

As described below, the anchors and the arched beam are preferably formed of a single crystal material, such as silicon, that expands or contracts in response to changes in temperature. Typically, the arched beam is comprised of a material with a positive coefficient of thermal expansion that expands with increases in temperature. However, the arched beam can also be created from material that has a negative coefficient of thermal expansion that contracts as temperature increases. In operation, each beam is adapted to further arch in a predetermined direction 50 in response to selective thermal actuation thereof. As a result of thermal actuation, the mirror 20 that is adapted for movement with the microactuator is moved into an actuated position as the arched beam controllably moves along the predetermined path. Once thermal actuation is removed, the arched beam will move opposite to the predetermined direction 50 so as to return to the initial non-actuated or rest position if the microactuator and/or mirror has not been latched into position as described below. Since the mirror moves with the microactuator, the mirror moves accordingly so as to return to the non-actuated position along with the arched beam once the thermal actuation is removed, if the microactuator and/or the mirror has not been latched into position.

One embodiment of the microelectromechanical mirror structure according to the present invention further includes a mechanical latch 70, as shown in FIG. 1. The mechanical latch is disposed overlying and affixed to the first major surface of the microelectronic substrate. Preferably, the mechanical latch is affixed through at least two anchors, for instance, anchor 25 and at least one of anchor 71 and anchor 72 as shown. Further, the mechanical latch is adapted to open in response to thermal actuation so as to receive the microactuator 30 and adapted to close once thermal actuation is removed so as to clamp the microactuator in position. As such, once the microactuator is clamped in position, the mirror 20 will be correspondingly held in place, in an actuated position, even after thermal actuation is removed from the microactuator. In order to release the microactuator and mirror, the mechanical latch is also adapted to reopen in response to further thermal actuation thereof. The microactuator is thereby unclamped and released, allowing the microactuator and mirror to return to the rest position in the absence of further thermal actuation of the microactuator.

In operation, the mechanical latch 70 is thermally actuated in order to clamp and subsequently release the microactuator 30. The mechanical latch may be designed to be responsive to various types of thermal actuation and to have numerous different configurations so long as the mechanical latch can selectively receive and hold the microactuator and the mirror in an actuated position and can controllably release the microactuator and the mirror to return to the rest position. In particular, the selective application of thermal actuation to the mechanical latch must sufficiently open the aperture 76 defined by the mechanical latch to receive the microactuator. In addition, the mechanical latch must close the aperture sufficiently once the mechanical latch is no longer thermally actuated so as to clamp the microactuator in position. Further, the mechanical latch must be adapted to controllably reopen the aperture to release the microactuator and allow subsequent motion thereof.

According to the above described embodiment of the present invention, both the microactuator and the mechanical latch require thermal actuation. Thermal actuation of either device can occur through various direct and indirect thermal arched beam heating techniques. According to the heating techniques described in the above mentioned U.S. patent application Ser. No. 08/767,192, the microactuator and the mechanical latch can be thermally actuated by various direct and indirect heating mechanisms. As such, the microactuator and/or the mechanical latch can include an external heater for indirectly heating the respective component. Alternatively, current can be passed through at least a portion of the microactuator and/or the mechanical latch in order to directly heat and thermally actuate the respective component. In the embodiment of FIG. 1, the mechanical latch is thermally actuated by direct heating. In this regard, a controlled electrical current can be directed through mechanical latch 70 to heat and therefore selectively thermally actuate the mechanical latch. In order to open the aperture defined by the mechanical latch, portions of the mechanical latch must therefore be differentially heated. Preferably, this differential heating is accomplished by designing the mechanical latch such that different portions of the latch have different cross sectional areas and therefore have different electrical resistances which, in turn, creates differential heating when current flows through the latch. For example, portions of the mechanical latch that have smaller cross sectional areas will have a higher electrical resistance and will therefore be heated more and move, i.e., expand, more than portions of the latch having larger cross sectional areas.

In operation, current is passed through the mechanical latch, such as by holding the anchors 71 and 72 at different voltages such that electrical current flows through the mechanical latch in order to provide thermal actuation. In the illustrated embodiment, the mechanical latch includes two halves, each of which is directly attached to a respective anchor. Each half of the mechanical latch includes an outer frame member 73 and 74, and an inner frame member 23 and 24. At a common portion 25 opposite the aperture 76, the inner frame members are anchored to the underlying microelectronic substrate 10. Preferably, a trench 78 is formed in the substrate underlying at least a portion of the thermally actuated portions of the mechanical latch, ie. the inner frame members, so as to provide thermal isolation and minimize heating losses to the microelectronic substrate. Trenches are shown in FIG. 1 as the areas defined within the dashed lines.

Since the inner frame members have a significantly smaller cross sectional area than the outer frame members, the inner frame members have a greater electrical resistance and will therefore be heated more than the outer frame members. As such, the inner frame members will expand more than the outer frame members and will cause the two halves of the mechanical latch, particularly those portions of the latch that are spaced from the anchors, to separate or pull apart, thereby further opening the aperture and permitting the leading end of the microactuator to be inserted or removed. Upon removing the thermal actuation, such as by removing the voltage difference, the mechanical latch will return to the non-actuated or rest position in which the aperture is no longer wide enough to permit the leading end of the microactuator to be inserted or removed.

By concurrently actuating both the mechanical latch and the microactuator, the leading end of the microactuator can be inserted through the expanded aperture defined by the latch. By removing the thermal actuation from the mechanical latch, the aperture is no longer expanded so that the latch can return to its rest position and the leading end of the microactuator can no longer be removed from the latch. As such, the mechanical latch will hold the microactuator and mirror in an actuated position even if the microactuator is no longer thermally actuated. As such, the MEMS moveable mirror structure of the present invention conserves energy by not requiring that the microactuator be continually thermally actuated in order to remain in the actuated position. In order to permit the microactuator and mirror to return to the non-actuated or rest position, preferably the microactuator is first thermally actuated. Subsequently, the mechanical latch is again thermally actuated so as to reexpand the aperture, such that the leading end of the microactuator can withdraw through the expanded aperture. Since the microactuator is released, the microactuator and mirror can return to the rest position once thermal actuation is no longer applied to the microactuator.

Preferably, the mechanical latch is designed so as to securely hold the microactuator in place once the microactuator has been latched. For example, the mechanical latch may define an inner surface 77 that is adapted to engage the leading end of the microactuator 30 when clamped. To facilitate this engagement, the leading end of the microactuator can include a pair of laterally extending surfaces which will engage the inner surface of the mechanical latch. For example, the leading end of the microactuator can have an arrowhead shape that includes a pair of laterally extending surfaces as shown in FIG. 1.

In order to absorb some of the mechanical stresses otherwise experienced by the microactuator, such as upon engagement of the leading end of the microactuator with the mechanical latch, the moveable MEMS mirror structure and, more particularly, the microactuator can also include a spring 80. As shown in FIG. 1, the spring is typically formed integral with the microactuator and is therefore preferably formed of single crystal silicon. The spring can be implemented in various ways and assume various configurations within the spirit of the present invention. For the embodiment shown in FIG. 1, an example of spring 80 implemented as a generally rectangular loop is shown. Regardless of the configuration, however, the spring flexes, such as by compressing or expanding, to absorb mechanical stresses sustained by the microactuator and ensure a reliable structure in operation. For instance, when the microactuator is clamped in position by the mechanical latch and thermal actuation is removed from the microactuator, the spring flexes by expanding to absorb at least some of the stresses encountered by the microactuator while the microactuator is held in place.

Microactuator Embodiments

Figure 2A:
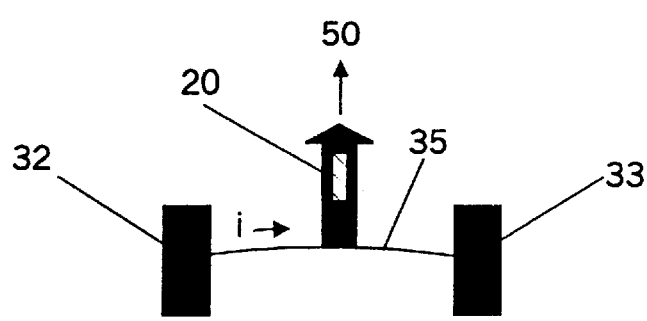
FIGS. 2(a), 2(b) and 2(c) provide top views of various embodiments of the thermal arched beam actuators, according to the present invention.
Figure 2B:
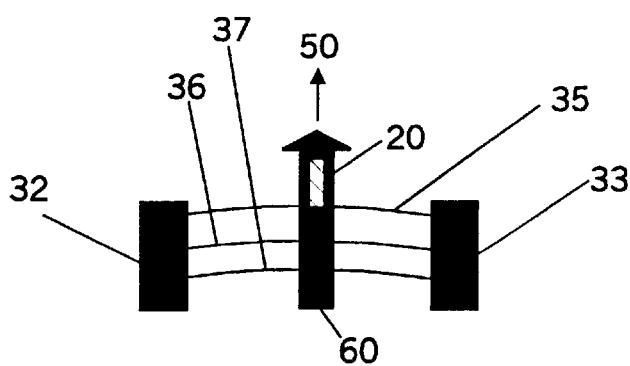
Figure 2C:
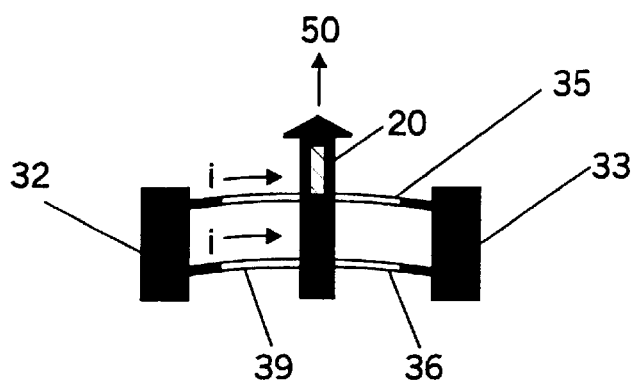

While the MEMS moveable mirror structure of the present invention can have microactuators of many different embodiments, one advantageous microactuator is the thermal arched beam (TAB) actuator described by U.S. patent application Ser. No. 08/767,192, the contents of which have been incorporated by reference herein. For instance, the embodiment of FIG. 1 includes a thermal arched beam actuator, as discussed above. As shown in FIGS. 2(a) and 2(b), a thermal arched beam (TAB) actuator may comprise a single arched beam or multiple arched beams. The single beam TAB actuator shown in FIG. 2(a) includes a single arched beam 35 disposed between at least two anchors, 32 and 33 while the multiple beam TAB actuator shown in FIG. 2(b) comprises multiple arched beams, for example beams 35, 36, and 37 as shown, disposed between at least two anchors, 32 and 33. In either instance, the TAB actuator is adapted to carry and move mirror 20 in the predetermined direction 50 from a non-actuated position to an actuated position as the arched beams arch further in response to thermal actuation. In particular, the TAB actuators can include a coupler or an actuator member that is connected to the arched beams and that extends forwardly of the arched beams in the predetermined direction. As shown in FIGS. 2(b) and 2(c), the coupler of the multiple beam TAB actuator operably interconnects the arched beams and is adapted to move in response to thermal actuation of the arched beams. As such, the coupler 60 of this embodiment serves to interconnect the arched beams and integrate the force generated by individual beams when thermally actuated. As shown in FIGS. 2(a) and 2(b), the mirror can be mounted upon a leading end of the coupler such that further arching of the arched beams advances the coupler and, in turn, moves the mirror 20. For either TAB actuator, however, once thermal actuation is removed, the thermal arched beams and the mirror will reassume the non-actuated position unless the microactuator is clamped or otherwise held in position.

Numerous techniques may be used to controllably thermally actuate the microactuator. In this regard, the microactuator may be indirectly thermally actuated, such as by an external heater. Alternatively, the microactuator may be directly thermally actuated by passing electrical current through at least some of the arched beams. Because the arched beams provide electrical resistance, heat is generated directly therein as the current flows through the arched beams. In addition, while the microactuator is generally actuated by heating, the microactuator may be designed to be actuated by temperature decreases which may reduce the arching of the thermal arched beams, for example.

As shown in FIGS. 2(a) and 2(c), the microactuator can be designed to be thermally actuated by electrical current flowing through at least part of the span of an arched beam, which serves to directly heat the arched beam. For example, FIG. 2(a) shows a current i flowing through the entire span of arched beam 35, which is constructed from a single material such that the electrical resistance is distributed homogeneously throughout the span. In this example, the arched beams 35 are preferably formed of a single crystal material, such as silicon. Optionally, the arched beams may be controllably doped to provide a predetermined amount of electrical resistance as required for heating purposes. In any case, heat generated by the electric current flowing therein is generated homogeneously throughout the span of an arched beam. However, when current flows through the entire span of an arched beam, a significant portion of the heat generated therein is lost to the microelectronic substrate through the anchors located at the lateral portions of the arched beam. As such, heating the medial portions of the arched beams contributes significantly more to the movement of the coupler and the corresponding movement of the mirror, because the beam is heated and arches before the heat is conducted to the lateral portions of the arched beams. Thus, heating the medial portions of an arched beam moves the coupler and mirror more efficiently because there is better thermal isolation from the anchors.

Accordingly, the microactuator of one embodiment is designed such that more heat is generated in the medial portions of the arched beams than in the remaining portions of the arched beams. FIG. 2(c) illustrates one example of this embodiment. As such, greater electrical resistance is provided by, and therefore more heat is focused upon, those portions of the arched beams, i.e., the medial portions, that contribute more to the resulting movement of the mirror so that heating loss in the lateral portions of the arched beams is largely avoided. In contrast to the embodiments shown in FIGS. 2(a) and 2(b), the arched beams in this embodiment are not constructed homogeneously.

As shown in FIG. 2(c), for example, at least a portion of the anchors and the lateral portions of the arched beams can be provided with an electrically conductive path so that the medial portions of the arched beam have relatively greater electrical resistance. Preferably, the arched beam may be formed from a semiconductor material, such as silicon, and the doping level can be varied as needed to control the electrical resistance across the span of the arched beam. Alternatively, a conductive material may be applied to at least part of the span of the arched beams, such as the lateral portions of the arched beams. Conductive materials, such as metal and, more particularly, such as gold or aluminum, which are more conductive than the single crystal material that preferably forms the arched beams may be used. As such, the medial portions of the arched beams provide a significantly greater electrical resistance than the lateral portions of the arched beam, which are coated with a more conductive material. When an electrical current i flows through the span of an arched beam having medial and lateral portions as described, significantly greater electrical heat is generated in the medial portions having greater electrical resistance. In any case, the medial portions of the arched beams will be preferentially heated so as to cause at least the medial portions of the arched beams to further arch without unnecessarily heating the lower resistance lateral portions of the arched beams. Heat loss through the anchors is thus largely avoided. Less heat energy is wasted on the lateral portions of the arched beams, so that more efficient direct heating is provided.

Figure 3:
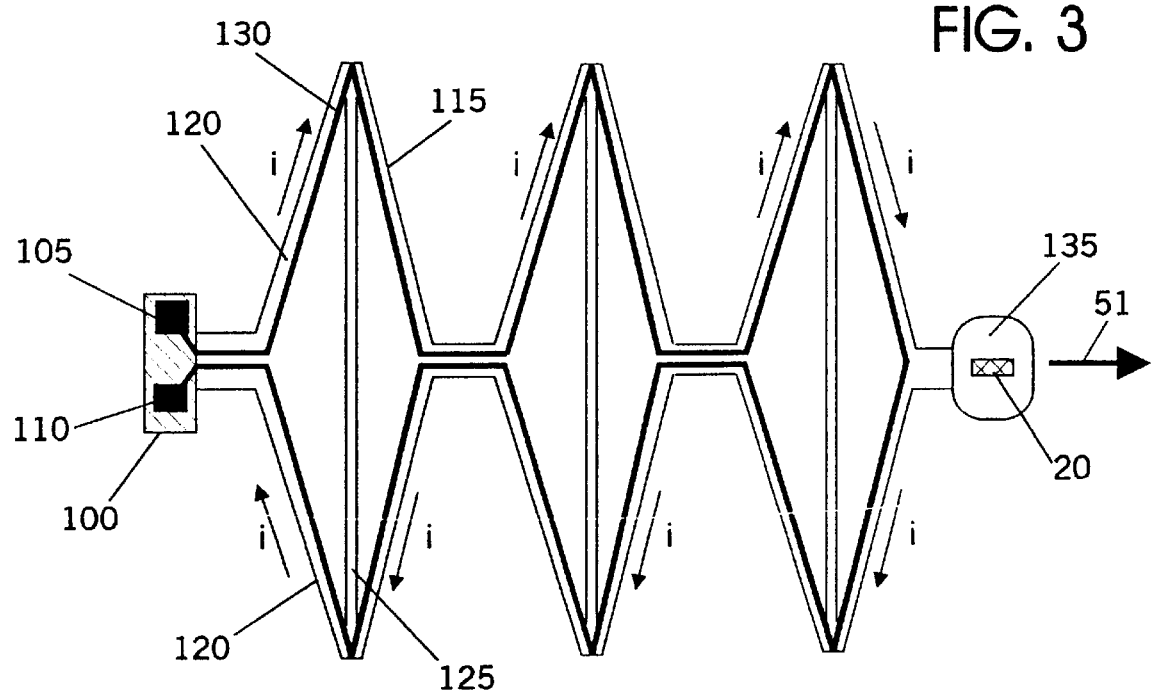
FIG. 3 provides a top view of a MEMS mirror structure including a thermal arched beam expansion array actuator according to one embodiment of the present invention.

Thermal arched beam structures can be designed so as to optimize selected operational characteristics. The examples of thermal arched beam actuators shown in FIGS. 1 and 2 are adapted and configured to provide relatively large mechanical stability and robustness. However, these examples require relatively long arched beams and relatively high operating temperatures in order to provide a given amount of deflection. That is, these TAB actuators are configured to provide optimum robustness and mechanical stability but require a relatively larger substrate area and higher operating temperatures in order to provide a given displacement. However, it is possible to arrange TAB actuators in other configurations, for instance in configurations adapted to provide a given displacement while requiring relatively lower operating temperatures and using relatively shorter arched beams. As such, these TAB actuator configurations are configured to minimize substrate area and operating temperatures. One example of a TAB actuator adapted to provide a given displacement with relatively less substrate area, shorter arched beams, and lower temperatures is shown in FIG. 3, which depicts a thermal arched beam expansion array actuator having multiple diamond shaped thermal actuators that expand in response to thermal actuation. The TAB expansion array actuator comprises at least one anchor affixed to the microelectronic substrate, and a plurality of thermally actuated cells extending from the anchor in a cantilever configuration overlying the microelectronic substrate.

In the illustrated embodiment, each cell is configured in a diamond shape and includes a crossbeam 125 and a pair of thermal arched beams, denoted as 115 and 120. The pair of arched beams are arranged such that concave portions thereof face one another. In addition, the crossbeam extends between and is connected to opposite ends of the pair of arched beams to thereby create a generally diamond shaped cell. The thermal arched beam expansion array actuator can also include a mirror carrier 135 that is connected to one of the cells, such as the furthest cell from the anchor, such that the mirror carrier is moved in a predetermined direction 51 in response to thermal actuation of the cells. Since a mirror 20 is generally mounted upon the mirror carrier, thermal actuation of the cells and the corresponding expansion of the cells in the predetermined direction also controllably moves the mirror.

As described above, the thermal arched beams of the thermal arched beam expansion array actuator can be heated in a variety of manners including indirect heating, such as by means of an external heater, or direct heating by passing current through the thermal arched beams. In the illustrated embodiment, a pair of contact pads 105 and 110 are disposed upon the anchor 100 and connected to a continuous electrically conductive path through at least a portion of the pair of thermal arched beams within each cell. The electrically conductive path is disposed along the thermal arched beams, either by selective doping or applying a conductor to the arched beams as previously described. Preferably, the conductive path has a lower electrical resistance than the remainder of the thermal arched beam, but sufficient electrical resistance to generate heat as required along the span of the arched beam. The electrically conductive path further interconnects adjacent cells, forming a continuous circuit loop so as to interconnect the pair of contact pads. However, the crossbeams are not coated with the conductive material to force the majority of the current to flow from contact pad to contact pad through the arched beams, as described below.

In operation, the TAB expansion array actuator is thermally actuated by passing current through the arched beams, such as by creating a voltage differential between the contact pads 105 and 110. As the current flows along the path of conductive material, heat is generated accordingly along the thermal arched beam. Heat is conducted from the path of conductive material into the remainder of the arched beams, thereby heating the arched beams. As such, each beam arches further, thus expanding each diamond shaped cell as each pair of beams separate further in response to thermal actuation. Collectively, the expansion of each pair of beams causes the TAB expansion array to move in preselected direction 51, thereby moving the mirror 20 accordingly. When current is removed, the pair of arched beams within each diamond shaped cell reassume the non-actuated position unless the microactuator has been latched in place as described above.

Figure 4:
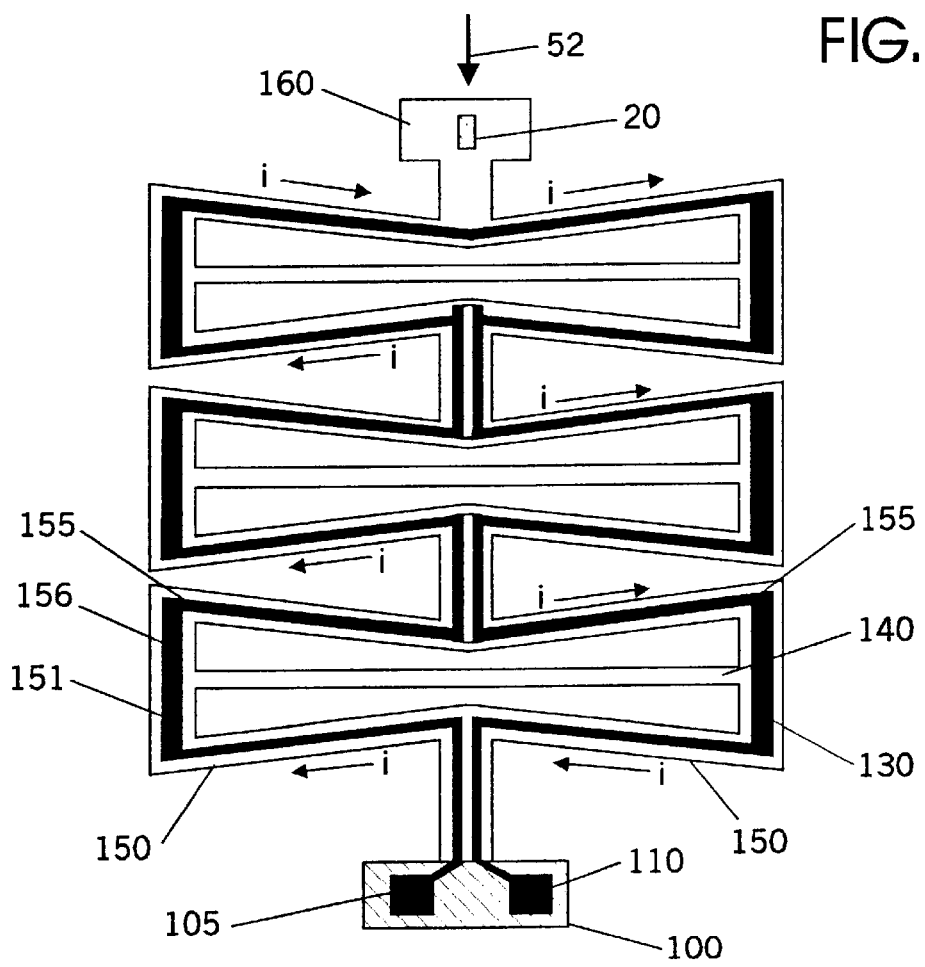
FIG. 4 provides a top view of a MEMS mirror structure including a thermal arched beam compression array actuator according to one embodiment of the present invention.

Another example of a TAB actuator adapted to provide a given displacement with relatively less substrate area, shorter arched beams, and relatively lower operating temperatures and substrate area is shown in FIG. 4. This Figure depicts a thermal arched beam compression array actuator having a plurality of bowtie shaped cells that compress in response to thermal actuation. The TAB compression array actuator comprises at least one anchor affixed to the microelectronic substrate, and a plurality of thermally actuated cells extending from the anchor in a cantilever configuration overlying the microelectronic substrate.

Each bowtie cell of the TAB compression array actuator includes a crossbeam 140 and a pair of thermal arched beams, denoted as 150 and 155. Pairs of arched beams are arranged such that convex portions of each pair of beams face one another. In addition, the crossbeam extends between and is connected to opposite ends of the pair of arched beams. As shown in FIG. 4, each cell generally includes a frame portion, such as 151 and 156, that interconnects the ends of the arched beams and the crossbeam. As such, each cell has a generally bowtie shaped cell. The TAB compression array actuator can also include a mirror carrier 160 that is connected to one of the cells, such as the furthest cell from the anchor, such that the mirror carrier is moved in a predetermined direction 52 in response to thermal actuation of the cells. Since a mirror 20 is generally mounted upon the mirror carrier, thermal actuation of the cells and the corresponding contraction or compression of the cells in the predetermined direction also controllably moves the mirror.

As described above, the thermal arched beams of the TAB compression array actuator can be heated in a variety of manners including indirect heating, such as by means of an external heater, or direct beating by passing current through the thermal arched beams. In the illustrated embodiment, a pair of contact pads 105 and 110 are disposed upon the anchor and connected to a continuous electrically conductive path through at least a portion of the pair of thermal arched beams within each cell. The electrically conductive path is disposed along the thermal arched beams, either by selective doping or applying a conductor to the arched beams as previously described. Preferably, the conductive path has a lower electrical resistance than the remainder of the thermal arched beam, but sufficient electrical resistance to generate heat as required along the span of the arched beam. The electrically conductive path further interconnects adjacent cells, forming a continuous circuit loop so as to interconnect the pair of contact pads. However, the cross-beams are not coated with the conductive material to force the majority of the current to flow from contact pad to contact pad through the arched beams, as described below.

In operation, the TAB compression array actuator is thermally actuated by passing current through the arched beams, such as by creating a voltage differential between the contact pads 105 and 110. As the current flows along the path of conductive material, heat is generated accordingly along the thermal arched beam. Heat is conducted from the path of conductive material into the remainder of the arched beams, thereby heating the arched beams. As such, each beam arches further, thus contracting or compressing each diamond shaped cell as each pair of beams come closer together in response to thermal actuation. Collectively, the compression or contraction of each pair of beams causes the TAB compression array to move in preselected direction 52, thereby moving the mirror 20 accordingly. When current is removed, the pair of arched beams within each bowtie shaped cell reassume the nonactuated position unless the microactuator has been latched in place as described above.

The MEMS moveable mirror structure of the present invention can also include other types of thermally actuated microactuators. As before, thermal actuation occurs due to a relative change in temperature that causes some structures to move relative to other structures. For instance, structures such as thermal arched beams can be heated or cooled differently than adjacent structures, such that the arched beams may be thermally actuated. In particular, the MEMS moveable mirror structure can include a thermally actuated composite beam microactuator. As with the aforementioned microactuators, these composite beam actuators are adapted for thermal actuation through direct heating techniques. As before, the thermally actuated composite beam actuator can move along a predetermined path that extends substantially parallel to the first major surface of the microelectronic substrate. Further, the composite beam actuator can be adapted to carry and correspondingly move the mirror and/or be adapted for latching by a mechanical latch or electrostatic latch as required. In addition, a plurality of composite beam actuators may be disposed in a thermally actuated array and controlled either individually or collectively.

Figure 5A:
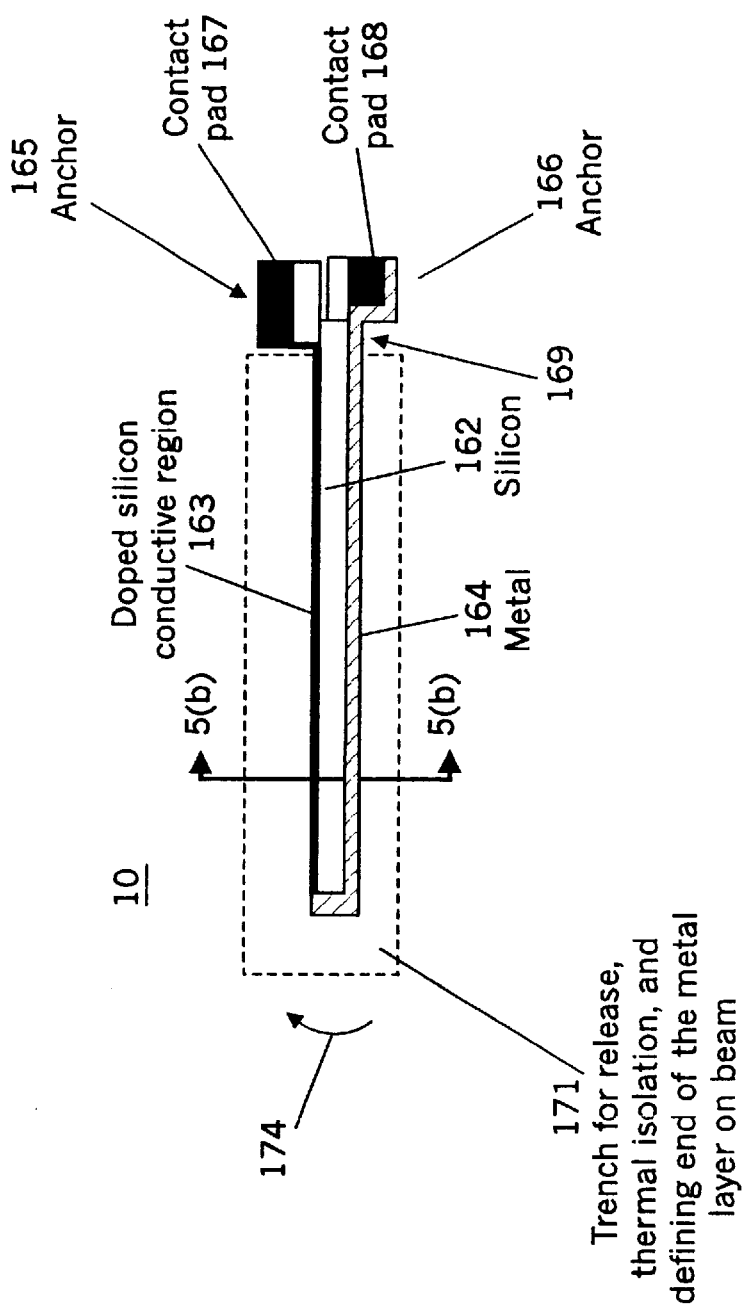
FIGS. 5(a) and 5(b) provide respectively a plan view and a cross section view taken along line 5(b)—5(b) in FIG. 5(a) of a thermally actuated composite beam actuator according to one embodiment of the present invention.
Figure 5B:
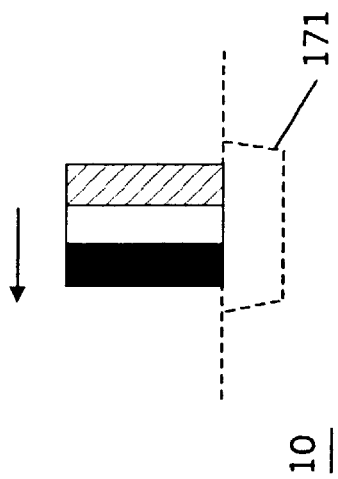

FIGS. 5(*a*) and 5(*b*) depict one embodiment of a microactuator that includes a thermally actuated composite beam actuator according to the present invention. As shown in FIG. 5(*a*), each thermally actuated composite beam actuator according to this embodiment comprises at least one anchor, such as 165 or 166, affixed to the microelectronic substrate and a composite beam extending from an anchor and overlying the first major surface of the microelectronic substrate 10. The composite beam has a proximal end 169 connected to the anchor, and a distal end 171 disposed furthest from the anchor. As such, the composite beam overlies and is suspended above the microelectronic substrate in a cantilever-like configuration. Although not necessary, the portion of the substrate underlying the composite beam actuator can define a trench for additional thermal isolation between the composite beam actuator and the substrate. For instance, FIG. 5(*b*), which depicts a cross-sectional view of FIG. 5(*a*) taken along line 5(*b*)—5(*b*), shows the suspended composite beam above a trench defined in the microelectronic substrate.

Further, each composite beam has at least two layers that respond differently to thermal actuation. As depicted in FIG. 5(*a*), the composite beam includes a first layer 162 and a second layer 164. Since the layers have different thermal coefficients of expansion, the layers respond differently to thermal actuation. For example, the first layer may comprise a semiconductor material, such as silicon, while the second layer could comprise a metallic material, such as gold or nickel, having a higher thermal coefficient of expansion than the first layer.

In operation, the distal end of each composite beam is adapted to bend so as to controllably move the mirror along the predetermined path in response to selective thermal actuation thereof. Since the layer having the higher thermal coefficient of expansion will expand more as temperature increases, the distal end will bend toward the layer having the lower thermal coefficient of expansion. For instance, in the example above, the distal end will bend toward the first layer formed of a semiconductor material. Of course, the thickness of the layers, the materials used therein, and the order in which the layers are included within the composite beam can be varied to permit the distal end to bend as needed.

As previously described, the composite beam actuator is adapted for thermal actuation, preferably through direct heating techniques using electric current. In order to permit direct heating, each composite beam defines an electrically conductive path that runs in a continuous loop through the composite beam and between a pair of contacts disposed upon the anchor. Preferably, electrical current passes from one contact and through one of the layers of the composite beam to the distal end of the composite beam prior to returning to the other contact via the other layer. Preferably, the electrically conductive path is disposed so as to substantially surround at least one of the layers comprising the composite beam. Of course, the electrically conductive path can be otherwise arranged to form a circuit loop to heat the composite beam. The electrically conductive path has a predetermined electrical resistance so as to permit thermal actuation of the composite beam when electrical energy is selectively applied thereto.

In one embodiment, the first layer 162 comprises a semiconductor material, such as silicon, in which at least the surface 163 furthest from the second layer 164 is controllably doped, such as with phosphorous or boron, in order to customize the resistance characteristics. The second layer preferably comprises a metallic material as described, and is electrically connected to the doped conductive surface of the first layer in order to provide a conductive return path having less resistance than the first layer. As such, the undoped portions of the semiconductor first layer of the composite beam have a higher electrical resistance than doped portions thereof. As a result, electrical current mostly follows the path defined by the doped portions and the metallic second layer. The interconnected first and second layers thereby comprise a generally C-shaped conductive path of varying resistance. Accordingly, the conductive path is provided between the contact pads, such as pads 167 and 168, disposed upon an anchor, such as anchor 165 and 166 respectively, by the first and second layers. As such, the composite beam is thermally actuated when current is passed along the conductive path of variable electrical resistance. For instance, an electrical current could flow from contact pad 167 along surface 163 into the interconnected second layer 164 returning back to contact pad 168 when a source of electrical energy is applied between the contact pads.

As mentioned above, the microelectronic substrate 10 underlying each composite beam can define a trench 171. The trench provides heating efficiency advantages, since the gap between the composite beam and the microelectronic substrate provides thermal isolation for correspondingly reducing heat loss. In addition, the trench simplifies the fabrication process used to deposit the second layer of metallic material upon the composite beam, since the trench serves to define the end of the metal layer at the sides and distal end of the composite beam. In contrast with conventional fabrication processes, the metal is deposited at an angle to coat the sidewalls of a composite beam. Without a trench, there is a likelihood that the sidewall metal layer will be shorted to the underlying microelectronic substrate and any metal features defined thereupon when metal is applied to the sidewalls. Accordingly, the trench provides an isolating gap useful to prevent shorting of the sidewall metal layer with landscaped metal features on the underlying substrate.

Figure 6:
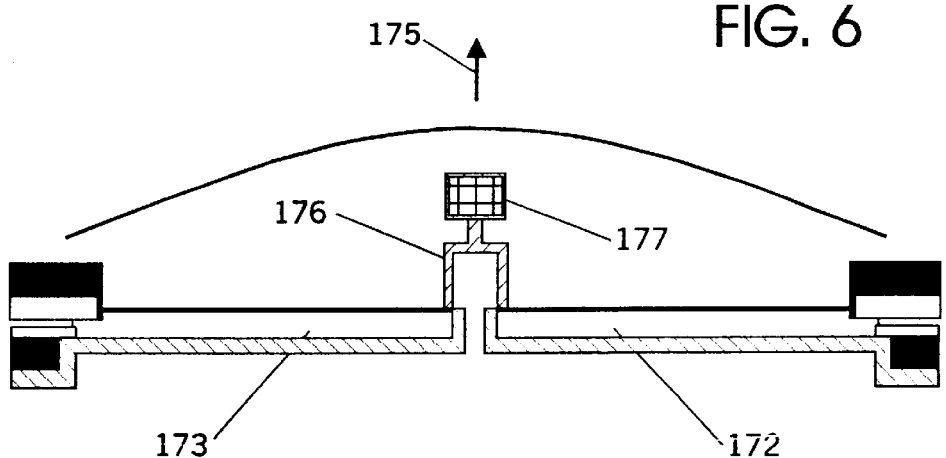
FIG. 6 provides a plan view of a dual thermally actuated composite beam actuator and an interconnecting structure according to one embodiment of the present invention.
Figure 7:
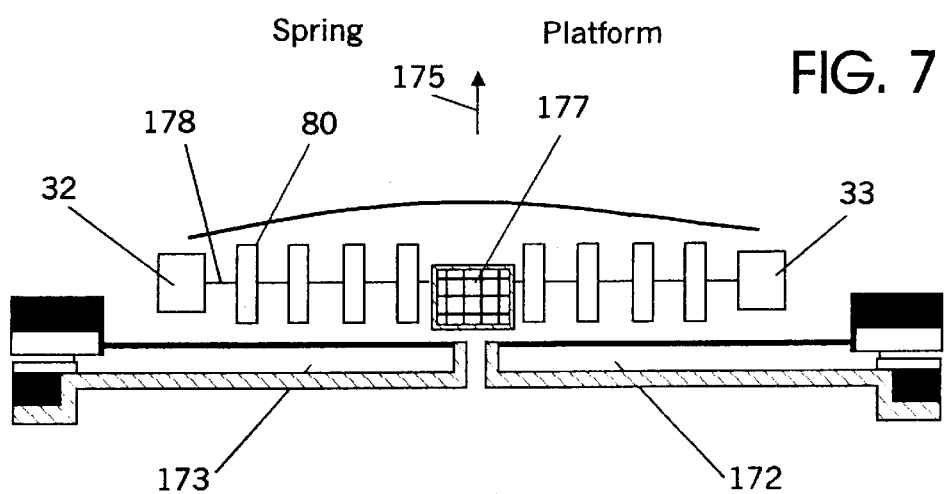
FIG. 7 provides a plan view of a dual thermally actuated composite beam actuator and an interconnecting structure according to another embodiment of the present invention.

In another embodiment, the microactuator includes dual thermally actuated composite beam actuators, as shown in FIGS. 6 and 7 for example. Two composite beam actuators are disposed proximately such that the distal ends of the respective composite beams face each other. The two composite beam actuators are shown in the non-actuated position in the Figure. In addition, the composite beams are adapted to move in unison in response to the selective application of thermal actuation. For example, in FIG. 6, composite beams 172 and 173 are adapted to bend in the direction of the arrow 175 when thermal actuation is applied thereto. When thermally actuated, the composite beams will deflect somewhat toward the dotted curved line, as shown. As described below, when two thermally actuated composite beam actuators work in unison, displacement in the direction of arrow 175 is generally more linear than when a single composite beam actuator is used. In this regard, as thermal actuation is applied thereto, a single composite beam actuator affixed to the microelectronic substrate at the proximal end has a limited range of relatively linear displacement before displacement becomes increasingly more rotary or angular.

As shown in FIG. 6, the dual composite beam actuator according to one embodiment further comprises an interconnecting member 176 connected between the distal ends of each composite beam, such as between 172 and 173. Since the interconnecting member is connected between two moving composite beams, the interconnecting member is preferably formed from a suitable material and is preferably shaped and sized so as to have some flexibility. In addition, the interconnecting member is preferably formed from materials used to form the layers of the composite beam, such as silicon, gold, or nickel, although other suitable materials may be used. The interconnecting member can be adapted to carry a mirror; the mirror being disposed and moved as previously described. For instance, the interconnecting member can include, or can be operably connected to, a platform 177 that carries the mirror such that the mirrored surface thereof is disposed out of plane relative to the first major surface of the microelectronic substrate. As above, the platform is preferably, but not necessarily, formed of materials used to form the composite beam layers. The interconnecting member can accordingly move the mirror between non-actuated and actuated positions in response to selective thermal actuation of the paired composite beam actuators.

A dual composite beam actuator according to another embodiment of the present invention is shown in FIG. 7. This embodiment also provides an interconnecting structure disposed proximate the distal ends of the respective pair of composite beams. The interconnecting structure comprises at least two anchors affixed to the microelectronic substrate, such as anchors 32 and 33 as shown, and a platform 177 operably connected between the anchors. For instance, in this example, the platform is operably connected to each anchor by at least two beams, such as beams 178, and at least one spring 80, as previously described. In addition, the platform is adapted to carry the mirror as described above. Because the springs can flex, such as by expanding or compressing, the serially connected beams and springs in effect comprise a flexible beam interconnecting the platform to the anchors. As such, when the respective composite beams are thermally actuated, the distal ends of the composite beams operably contact the platform move the platform and mirror accordingly between non-actuated and actuated positions. The springs flex as the beams bend to move the platform, such that the platform displaces linearly in the direction of arrow 175. This dual composite beam actuator embodiment is advantageous because the interconnecting structure compensates for unequal movement of the respective composite beams, and accordingly provides enhanced linear displacement characteristics as compared to the aforementioned single and dual composite beam actuator embodiments. In addition to the foregoing types of microactuators, those skilled in the art will appreciate that many other thermally actuated microactuator structures can be applied advantageously within the scope and spirit of the present invention.

Electrostatic Latch Embodiments

Figure 8:
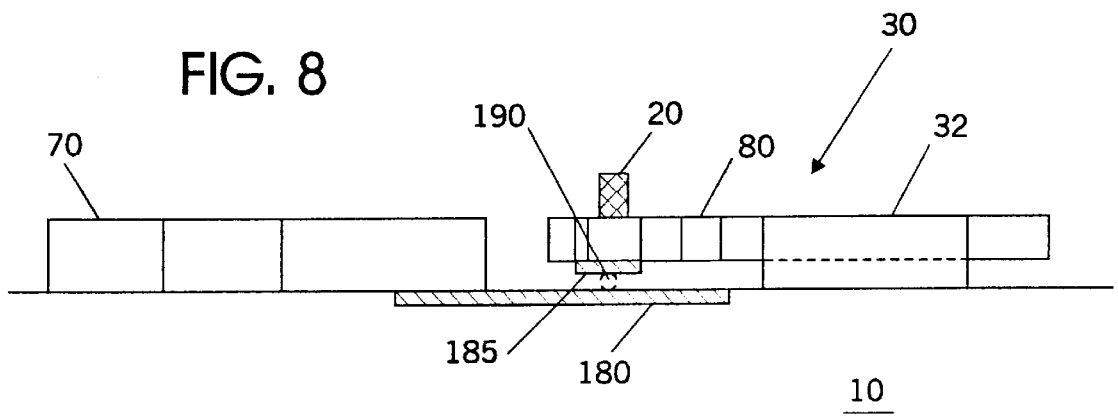
FIG. 8 provides a side view of a moveable MEMS mirror structure and an electrostatic latch according to one embodiment of the present invention.

As shown in FIG. 1 and described previously, the MEMS moveable mirror structure can include one or more mechanical latches to clamp the microactuator and mirror in a desired position. However, mechanical latches can only clamp the microactuator in position at one or more discretely defined points along the predetermined path of movement of the microactuator. As shown in FIG. 8, however, the MEMS moveable mirror structure can include an electrostatic latch, either alone or in combination with at least one mechanical latch 70, in order to clamp the microactuator and mirror at any desired position along the predetermined path of movement, according to one embodiment of the present invention.

The microactuator and mechanical latch of FIG. 1 are shown in a side view in FIG. 8. In FIG. 8, however, an electrostatic latch has been added. In particular, the electrostatic latch comprises a substrate electrode 180 disposed on the microelectronic substrate 10 and an actuator electrode 185 disposed on microactuator 30. Preferably, the actuator electrode is disposed upon a portion of the leading end of the coupler that faces the substrate. In addition, the substrate electrode extends lengthwise along the entire predetermined path of movement of the microactuator. By applying appropriate voltages to the electrodes, the microactuator and mirror can therefore be clamped in place anywhere along the predetermined path of movement, as described below.

In operation, the application of a voltage difference between the substrate electrode and actuator electrode creates an electrostatic force 190 therebetween. Preferably, a voltage difference is normally applied to create an attractive electrostatic force, such that the microactuator and mirror can thereby be latched in place. In this regard, if the respective electrodes are attracted by electrostatic force, the microactuator can be drawn into contact with the substrate such that the mirror is accordingly clamped in place. Those skilled in the art will appreciate that while the substrate electrode and actuator electrode are preferably disposed in respective parallel planes, the respective electrodes can be disposed in any planar relationship with respect to the microelectronic substrate plane. For example, as shown in the Figure, the respective electrodes may be disposed in planes parallel to the plane defined by the microelectronic substrate, or in planes that intersect the microelectronic substrate plane as necessary. The microactuator can thus be controllably clamped in position at any location along the preselected path at which the actuator electrode and substrate electrode overlap. As such, a MEMS moveable mirror structure that includes an electrostatic latch can be latched in many more positions than a MEMS moveable mirror structure that only includes a mechanical latch or latches. In the embodiment illustrated in FIG. 8 that includes both an electrostatic latch and a mechanical latch, however, the electrostatic latch can be used to latch the microactuator at any place along its path of movement, while the mechanical latch can be deployed once the leading end of the microactuator is inserted into the mechanical latch, such that the electrostatic latch need not be energized and energy is correspondingly conserved.

Electromagnetic Application Embodiments

Any of the microelectromechanical moveable mirror structures according to the present invention can be applied to redirect electromagnetic radiation. As used in the present invention, the term electromagnetic radiation includes but is not limited to light, laser, radio frequency, infrared, or any other type of electromagnetic radiation that can travel along a path, whether visible or not. If a source directs electromagnetic radiation along a path, a moveable microelectromechanical mirror structure can be deployed to intersect and redirect the path of electromagnetic radiation. As such, the moveable microelectromechanical mirror structure can be selectively thermally actuated to either intersect or not intersect the path of electromagnetic radiation. For example, the MEMS moveable mirror structure can be designed to intersect the path of electromagnetic radiation in instances in which the microactuator has been thermally actuated, but to be removed from the path of electromagnetic radiation in instances in which the microactuator is in a non-actuated or rest position. Since the mirrored surface of the mirror is generally designed to deflect the electromagnetic radiation, the microactuator of this example can be thermally actuated in instances in which it is desired to deflect or divert the electromagnetic radiation. Because the moveable microelectromechanical mirror structures provide mirrors disposed out of plane relative to the microelectronic substrate surface and can precisely and controllably move the mirrors and selectively clamp the mirrors in a desired position, these MEMS moveable mirror structures are particularly well suited for selectively redirecting electromagnetic radiation.

MEMS Moveable Mirror Array Embodiments

Figure 9:
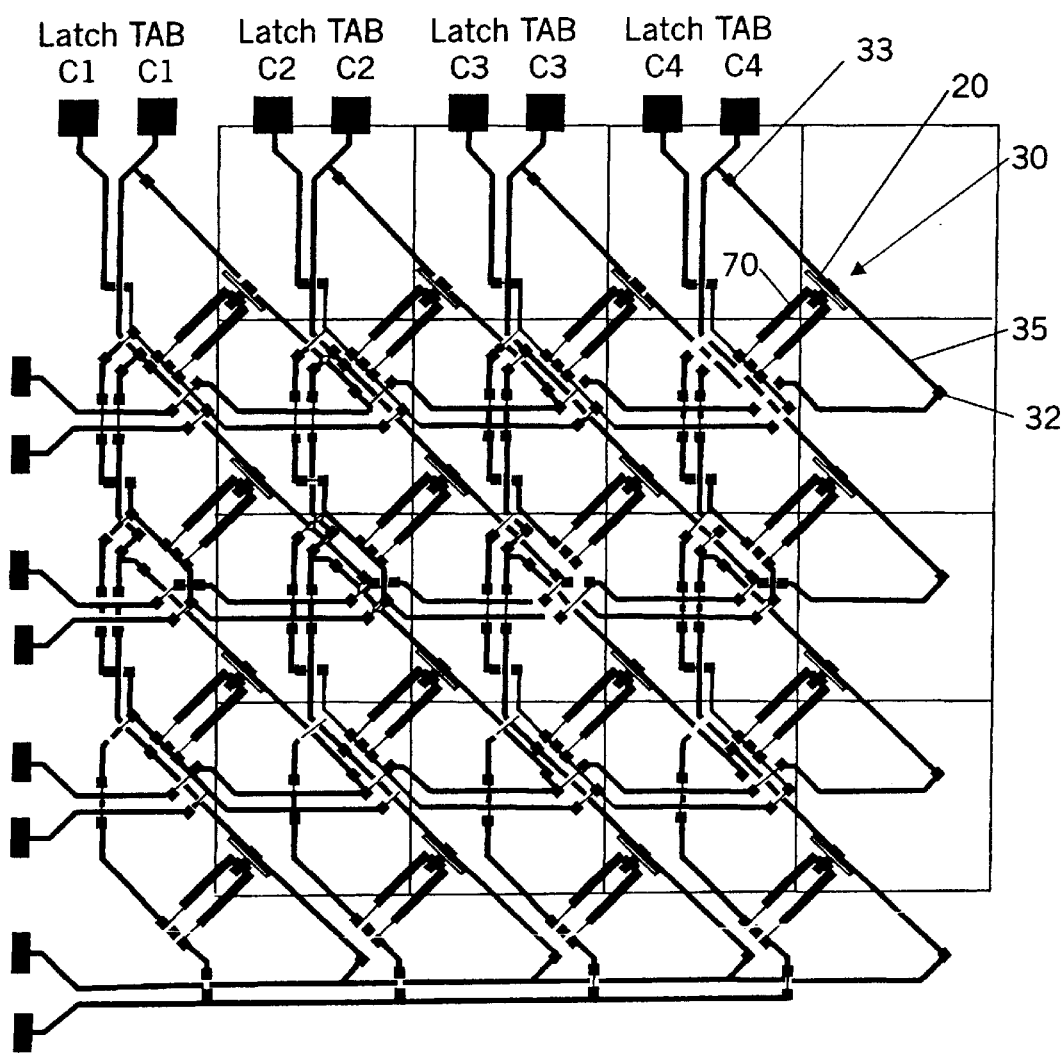
FIG. 9 provides a top view of a MEMS moveable mirror array according to one embodiment of the present invention.

According to one embodiment of the present invention, the microelectromechanical moveable mirror structures are deployed in an array, such as a switching array. As shown in FIG. 9, the microelectromechanical moveable mirror array can therefore be provided that includes a microelectronic substrate 10 having a first major surface, and a plurality of moveable microelectromechanical mirror structures. While the array of the illustrated embodiment includes moveable MEMS mirror structures of the embodiment depicted in FIG. 1, the moveable MEMS mirror structures can be embodied in any of the manners described above. Typically, each of the moveable MEMS mirror structures of an array or the same. However, an array can include different types of moveable MEMS mirror structures, if so desired.

The plurality of moveable microelectromechanical mirror structures are disposed upon the microelectronic substrate in respective predetermined positions and are typically arranged in rows and columns as described below. Each moveable microelectromechanical mirror structure comprises a microactuator and mirror as previously discussed. In particular, the microactuator 30 is preferably formed from a single crystal material, disposed upon the first major surface of the microelectronic substrate, and adapted for thermal actuation so as to controllably move along a predetermined path that extends substantially parallel to the first major surface of the microelectronic substrate. The mirror 20 is also preferably formed from the single crystal material and is adapted for movement with the microactuator between a nonactuated position and an actuated position in response to selective thermal actuation. The mirror further has a mirrored surface disposed out of plane relative to the first major surface of the microelectronic substrate in both the nonactuated position and actuated position. As such, each mirror of the resulting array can be individually positioned by selectively actuating the respective microactuator.

One embodiment of the MEMS moveable mirror array further includes a thermal activation matrix having a plurality of row thermal activation paths and a plurality of column thermal activation paths. As such, a substantial number of activation paths may be disposed upon the first major surface of the microelectronic substrate. In some cases, it may be necessary to interconnect activation paths that are separated by some intervening MEMS structure, such as another activation path, a mechanical latch, a microactuator, or the like. Accordingly, some sort of bridging structure is provided when needed to interconnect separated activation paths.

One embodiment of the MEMS moveable mirror array includes a relatively traditional bridging structure. In this embodiment, a dielectric layer is deposited over the intervening structure and separated activation paths, such that the separated activation paths can be interconnected thereover. The dielectric layer is selectively deposited so as to provide openings over portions of the separated activation paths, such that the surface of each separated activation path is exposed. Next, a metallization layer is selectively applied over the dielectric layer, such that a metallic connection is established with the exposed surface of each separated activation path through the openings. The metallization layer is also used to deposit one or more metal lines so as to interconnect each separated activation path through the metallic connections. As such, the metal line(s) over the dielectric layer are used to cross over the formerly intervening structure(s) and interconnect the formerly separated activation paths, similarly to established printed circuit board techniques. However, those skilled in the art will appreciate that this bridging structure is not suitable for bypassing intervening structures capable of motion, such as microactuators, mechanical latches, thermal arched beam structures, or the like.

In another embodiment, the MEMS moveable mirror array further includes a separate bridging structure overlying the intervening structure. For example, a plate or some other structure can serve as a jumper to bypass the intervening structure and interconnect the interrupted activation paths. The plate or jumper can be formed from any suitable substrate or material, such as silicon or glass. In addition, the plate or jumper can further include one or more metal lines for interconnecting the separated activation paths. Raised posts rising from the substrate above the level of the intervening structure are created. Various techniques may be used to create the posts, such as by defining posts in silicon, or applying oxide and metallization layers. The raised posts are electrically connected to the respective separate activation paths. Preferably, the top surface of the raised posts is conductive, and adapted to interconnect with the metal lines disposed upon the plate or jumper, such that the metal lines on the plate or jumper can overlie the posts and establish an interconnection between the posts. Preferably, the plate or jumper is aligned to the posts using complimentary reference marks, and preferably the plate or jumper is affixed to the posts and underlying substrate surface. Those skilled in the art will appreciate that while this bridging structure is preferred for bypassing structures capable of motion as described above, this bridging structure can be used to bypass any type of intervening structure.

Either bridging structure embodiment can be appropriately designed such that any and all interrupted connections within the MEMS mirror array are made, so that a fully operable activation matrix is established. Accordingly, the various paths of the activation matrix will contact respective ones of the microactuators of the moveable MEMS mirror structures as described below.

As shown in FIG. 9, one row thermal activation path and one column thermal activation path is preferably electrically connected to the microactuator of each respective moveable microelectromechanical mirror structure within the mirror array. As such, the microactuator of each moveable microelectromechanical mirror structure within the mirror array can be individually addressed or selected. For purposes of illustration, the row thermal activation paths and the column thermal activation paths of the embodiment of FIG. 9 are designated TAB R1, TAB R2, TAB R3, TAB R4 and TAB C1, TAB C2, TAB C3, TAB C4, respectively. For example, TAB R1 and TAB C4 are the row thermal activation path and column thermal activation path used to thermally actuate the microactuator designated as 30, which is in the first row and fourth column of the moveable MEMS mirror array.

As described above, the moveable MEMS mirror structures can also include a latch, such as a mechanical latch, to secure the mirror of the respective moveable MEMS mirror structure in an actuated position without continuing to thermally actuate the microactuator. Accordingly, the MEMS moveable mirror array can further include a latch activation matrix having a plurality of row latch activation paths and a plurality of column latch activation paths. As described above in conjunction with the thermal activation matrix, any missing or interrupted connections within the latch activation matrix can be established by the bridging structures as described above. The latch activation matrix is preferably designed such that one row latch activation path and one latch column activation path are electrically connected to the mechanical latch of each respective moveable microelectromechanical mirror structure within the mirror array. As such, the mechanical latch corresponding to each moveable microelectromechanical mirror structure within the mirror array can be individually addressed or selected. For purposes of illustration, the row latch activation paths and the column latch activation paths of the embodiment of FIG. 9 are designated Latch R1, Latch R2, Latch R3, Latch R4 and Latch C1, Latch C2, Latch C3, Latch C4, respectively. For example, Latch R1 and Latch C4 are the row activation path and column activation path used to thermally actuate the mechanical latch designated as 70, which is in the first row and fourth column of the moveable MEMS mirror array. By appropriately directing current along the activation paths, each respective mirror can thus be controllably positioned and optionally latched as described above.

Although not illustrated in conjunction with the embodiment of the MEMS moveable mirror array depicted in FIG. 9, the microactuators of the moveable MEMS mirror structures can be embodied in many different forms, including each of the thermal arched beam actuators described above and illustrated in FIGS. 1–4. While mechanical latches are particularly useful for holding the microactuators and the mirrors in position without having to supply additional power, one or more of the moveable MEMS mirror structures of the MEMS moveable mirror array can also include electrostatic latches as illustrated in FIG. 8.

While the MEMS moveable mirror array can be utilized in a variety of applications, the MEMS moveable mirror array is particularly useful for switching or redirecting beams of electromagnetic radiation. As such, the MEMS moveable mirror array can further comprise a source of electromagnetic radiation directed along at least one path toward the MEMS moveable mirror array. According to this embodiment of the present invention, one or more mirrors can be controllably positioned by selective thermal actuation of the corresponding microactuators, such that the path of electromagnetic radiation is thereby redirected by the mirrored surface of the mirror(s).

Whether single or arrayed MEMS moveable mirror structures are used, a method of redirecting electromagnetic radiation directed along at least one path is correspondingly provided. According to this method, electromagnetic radiation is initially directed by a electromagnetic radiation source along at least one path. One or more microactuators are then thermally actuated so as to controllably move along the predetermined path that extends substantially parallel to the first major surface of the microelectronic substrate. As such, the mirror carried by each microactuator is also controllably moved in response to thermal actuation of the microactuator. In particular, the mirror is controllably moved from a non-actuated position in which the mirrored surface is out of place relative to the first major surface of the microelectronic substrate to an actuated position in which one mirrored surface intersects the at least one path of electromagnetic radiation while remaining out of plane relative to the first major surface of the microelectronic substrate. Upon being moved into and therefore intersecting the path of the electromagnetic radiation, the mirror redirects the electromagnetic radiation, as desired.

In one embodiment in which the moveable MEMS mirror structures include latches, the method of redirecting electromagnetic radiation also contemplates selectively clamping at least one microactuator in place following thermal actuation thereof so as to hold the corresponding mirror in position relative to at least one path of electromagnetic radiation. Each latch may comprise a mechanical latch, an electrostatic latch, or both types of latches.

MEMS Moveable Mirror Structure Fabrication

Figure 10A:
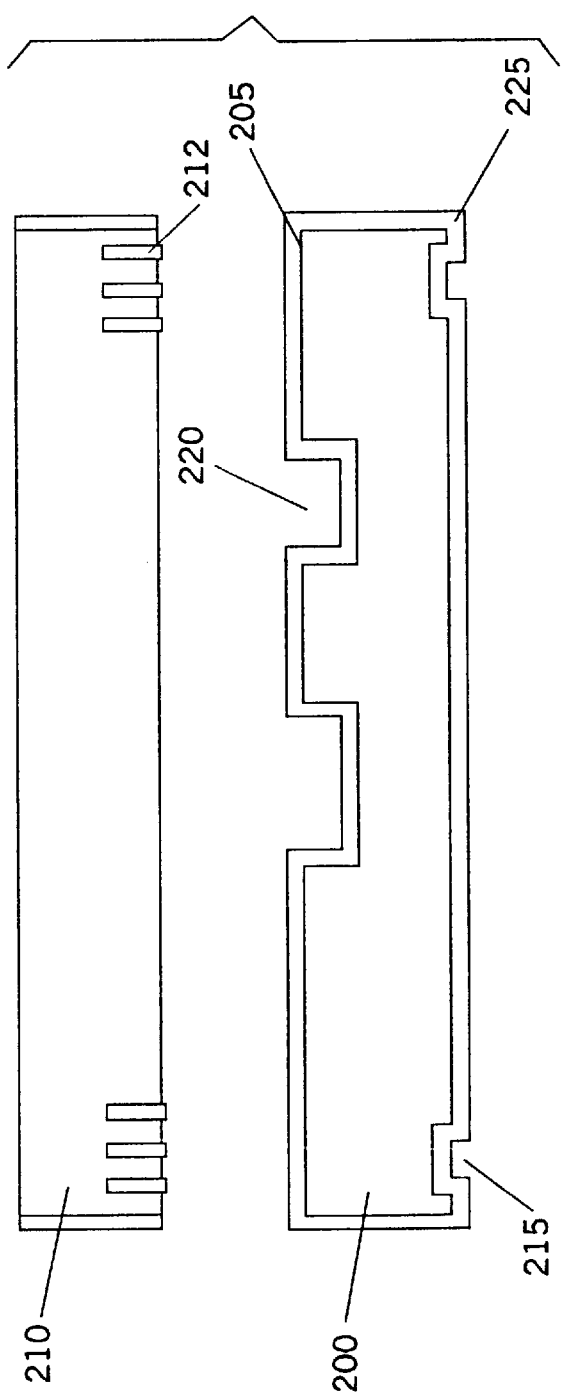

A method of fabricating the MEMS moveable mirror structures is provided by the present invention. One embodiment of the method of fabricating according to the present invention includes several steps as depicted in FIGS. 10(a) to 10(f) in which MEMS moveable mirror structures are fabricated, preferably from a single crystal wafer. For instance, the single crystal wafer can be a 110 silicon wafer, which is particularly well suited for forming MEMS structures having mirrors. First, a carrier wafer 200 having a first major surface 205 is provided. Typically, the carrier wafer is formed of silicon, although any other suitable substrate material having a generally planar surface may be used. As shown in FIG. 10(a), one or more trenches 220 can be photolithographically defined and etched into the first major surface of the carrier wafer. As described below, the trenches are preferably located so as to underlie the thermally actuated components of the moveable MEMS mirror structures, in order to provide thermal isolation from the carrier wafer and increase heating efficiency in operation. After forming the trenches in the first major surface, the carrier wafer is generally coated with an oxide layer. For example, area 225 as shown in this Figure represents an oxide layer grown upon the carrier wafer 200.

As also shown in FIG. 10(a), single crystal wafer 210 is then aligned with and bonded to the first major surface of the carrier wafer. Although the single crystal wafer is typically bonded by fusion bonding, the single crystal wafer can be bonded in other manners, if so desired. Prior to bonding the single crystal wafer to the carrier wafer, the wafers are preferably aligned. In one embodiment, an alignment pattern can be formed in the surface of the single crystal wafer that will eventually be bonded to the carrier wafer. The alignment pattern is used to locate the crystal plane as well as to provide reference marks that are indirectly aligned to the trenches, so that thermally actuated structures can be aligned to the trenches. Mirrors can similarly be aligned to the crystal plane, using the reference marks. As will be known to those skilled in the art, the alignment pattern used to locate the crystal plane is typically formed by etching a series of alignment trenches that have been photolithographically defined into the surface of the single crystal wafer. In addition, one or more reference marks can be formed in the second major surface of the carrier wafer, opposite the first major surface that is bonded to the single crystal wafer. Typically, the reference marks are also formed by etching one or more reference trenches that have been photolithographically defined into the second major surface of the carrier wafer. For instance, trenches 212 are shown in FIG. 10(a). After identifying the 111 crystal plane of the single crystal wafer based upon the relative verticality of the different alignment trenches, i.e., determining which alignment trench is least undercut, the 111 crystal plane of the single crystal wafer can be aligned in a predetermined manner with respect to the reference marks defined by the carrier wafer. Thereafter, all alignment can be based upon the reference marks defined by the carrier wafer that remain exposed throughout the fabrication process.

Figure 10B:
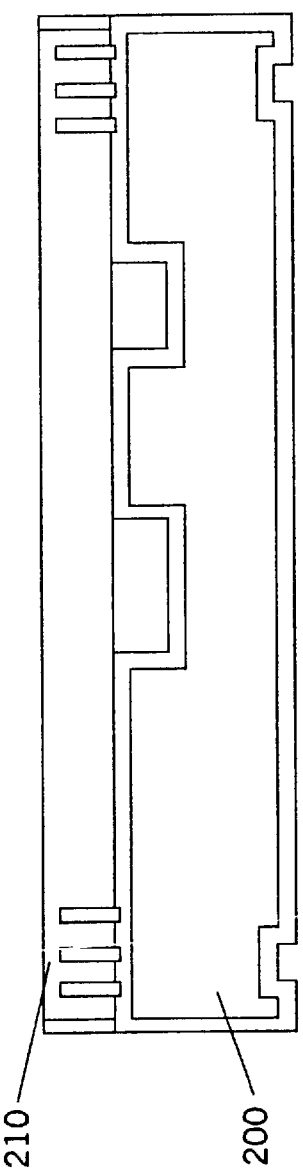
Figure 10E:
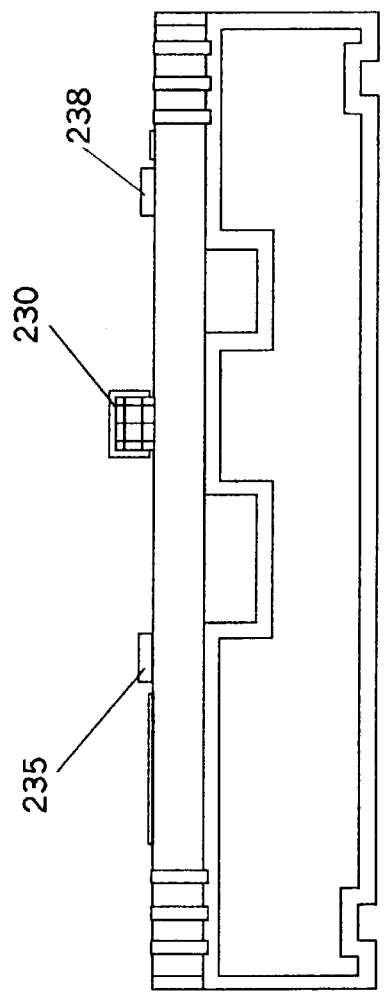
Figure 10F:
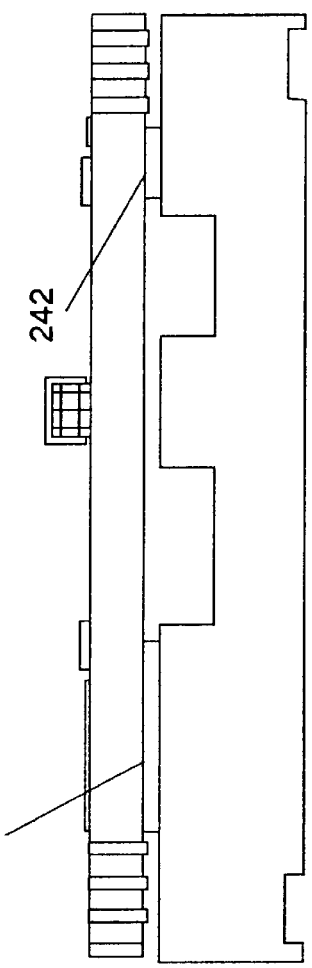

Once properly aligned, the carrier wafer and single crystal wafer will be bonded as shown in FIG. 10(b). After bonding the wafers together, the single crystal wafer is polished to the desired thickness and is then selectively etched to define a moveable MEMS mirror structure having a microactuator and a mirror, preferably formed integral with the microactuator. As described above, the mirror has a mirrored surface disposed out of plane relative to the first major surface of the carrier wafer in both the non-actuated position and the actuated position. In order to fabricate the moveable MEMS mirror structure of FIG. 1, an oxide layer is initially deposited upon the single crystal wafer and selectively removed except from those portions of the single crystal wafer that will define the mirrors. As such, the oxide layer only remains upon the top of that portion of the single crystal wafer that will form each mirror. The exposed portion of the single crystal wafer is then wet etched to produce the structure of FIG. 10(c). For example, mirror 230 is shown in this Figure. Another oxide layer is then deposited and selectively removed so as to cover all exposed surfaces of the mirrors and to cover portions of the single crystal wafer that will define posts. The exposed portion of the single crystal wafer is then etched, such as by dry etching, to further define the mirrors and the posts. See FIG. 10(d). For instance, posts 235 and 238 are shown in this Figure. Next, the single crystal wafer is selectively doped to make the posts, if included in the embodiment being fabricated, and other etched surfaces more conductive.

As a result of the etching process, the mirrored surface of the mirrors defines a plane that extends perpendicular to the first major surface of the carrier wafer, thereby facilitating controlled reflection of electromagnetic radiation. While the bare silicon that forms the mirrors can effectively reflect the electromagnetic radiation in some applications, the mirror can also be metallized to improve the reflectivity of the resulting mirrored surface for certain types of electromagnetic radiation. Typically, the metallization is performed in two steps with a first side of the mirrors being initially metallized. Preferably, the first metallization step is followed by the metallization of the opposed second side of the mirrors. In this manner, a mirrored surface is provided on the mirrors through successive metallization steps. See FIG. 10(e). Of course, those skilled in the art will appreciate that some applications may only require that one side of each mirror be metallized. These metallization steps can also be used to define metal lines or traces upon the first major surface of the single crystal wafer and upon selected components of the microactuators, such as the anchors and lateral portions of the thermal arched beams as shown in FIG. 2(c) for example, and upon the anchors of the mechanical latches in order to make the desired electrical contact with these components. Metallized areas are shown in black in FIGS. 10(e) and 10(f).

Thereafter, those portions of the single crystal wafer that will define the microactuators, including the anchors, the arched beams and the coupler, and the mechanical latches are defined photolithographically. The exposed portions of the single crystal wafer are then dry etched in order to form the corresponding structures. Upon reaching the first major surface of the carrier wafer, the etching is terminated. The resulting structure is then further etched to selectively remove those portions of the oxide layer coating the carrier wafer that underlie moveable components of the moveable MEMS mirror structure, such as the thermal arched beams, the coupler, the mirror and all portions of the mechanical latch other than the anchors. See FIG. 10(f), for example.

Due to the removal of those portions of the oxide layer coating the carrier wafer that underlie moveable components of the moveable MEMS mirror structure and further due to the trenches 220 defined in the first major surface of the carrier wafer, the thermal arched beams and the coupler of the microactuators and all portions of the mechanical latches other than the anchors are released and therefore moveable relative to the carrier wafer. As such, thermal actuation of the microactuator will cause the microactuator to move along a predetermined path extending substantially parallel to the first major surface of the carrier wafer, which will accordingly cause the mirror to be moved between the non-actuated position and actuated position. However, some oxide portions between the carrier wafer and single crystal wafer are purposefully not removed, such as 240 and 242 in FIG. 10(*f*). These oxide portions help to support and bond the carrier and single crystal wafers together after moveable structures have been released as described above.

If a dielectric and metal bridging structure is required, a dielectric layer is selectively applied after the mirrors and lines have been defined and metallized. Openings are provided in the dielectric layer to permit access to the separate activation paths to be interconnected. Another metallization step is applied to provide a connection to the separated activation paths through the respective openings, and to provide metal line(s) upon the dielectric layer to interconnect the separated activation paths through the opening connections. As such, the formerly separated activation paths are interconnected by metal line(s) bridging over the intervening structure(s). If a post and plate/jumper bridging structure is used, the fabrication method includes further steps. First, material to be used for the plate or jumper is obtained. Any suitable substrate material can be used, such as silicon or glass. If the material is not dielectric, for example if silicon is used, a layer of dielectric material is then applied to the surfaces to be used as a bridging plate or jumper. After a suitable dielectric surface is provided, interconnecting metal lines are defined with a metallization step, so as to bridge over any intervening structures and interconnect the corresponding posts. Next, alignment marks or cavities are created in the plate or jumper, such that the interconnecting metal lines may be lined up so as to interconnect the posts. Then the plate or jumper is aligned with the corresponding alignment marks and bonded to the single crystal wafer and carrier wafer.

The method of fabricating a microelectromechanical mirror structure can be used to form the various microactuators described previously. In particular, the step of further selectively etching the single crystal wafer to define a microactuator step can comprise the step of further selectively etching the single crystal wafer to define a microactuator selected from the group consisting of a thermal arched beam actuator, a thermal arched beam compression array actuator, and a thermal arched beam expansion array actuator according to the present invention.

In addition to or instead of the mechanical latch, the fabrication method can be adapted to fabricate a moveable MEMS mirror structure that includes an electrostatic latch. In this regard, an actuator electrode can be deposited upon the surface of the single crystal wafer that will be bonded to the carrier wafer and that will correspond to the leading end of the coupler as shown in FIG. 8. In addition, a substrate electrode is preferably deposited upon the first major surface of the carrier wafer at a location that corresponds to the path of movement of the resulting microactuator. As will be apparent, the actuator and substrate electrodes must be deposited prior to bonding the wafers together. In addition, as mentioned above, the respective electrodes can be disposed in any planar relationship with respect to the plane defined by the underlying carrier wafer.

As described above, the MEMS moveable mirror structures of the present invention include mirrors having a mirrored surface that are out of the plane relative to the first major surface of the underlying substrate in both the actuated and nonactuated positions. As such, the MEMS moveable mirror structures can be employed in various applications that demand or prefer moveable mirrors having an out of plane mirrored surface. For example, the various embodiments of the MEMS moveable mirror structures can be utilized in a wide variety of applications, such as laser printing and a variety of switching applications.

In the drawings and specification, there have been disclosed typical preferred embodiments of the present invention and, although specific terms are employed, they are used only in a generic and descriptive sense only and not for purposes of limiting the scope of the present invention as set forth in the following claims.

That which is claimed:

1. A moveable microelectromechanical mirror structure comprising:
   a microelectronic substrate having a first major surface;
   a microactuator, disposed upon the first major surface of the microelectronic substrate and adapted for thermal actuation so as to controllably move along a predetermined path that extends substantially parallel to the first major surface of said microelectronic substrate; and
   a mirror, adapted for movement with said microactuator between a non-actuated position and an actuated position in response to thermal actuation, said mirror having a mirrored surface disposed out of plane relative to the first major surface of said microelectronic substrate in both the non-actuated position and the actuated position, wherein said microactuator and said mirror are formed from a single crystal material.

2. A moveable microelectromechanical mirror structure according to claim 1, wherein said microactuator comprises a thermal arched beam actuator, said thermal arched beam actuator comprising at least two anchors affixed to said microelectronic substrate and at least one arched beam disposed between said anchors, wherein said at least one thermal arched beam is adapted to arch further and controllably move along said predetermined path in response to selective thermal actuation thereof.

3. A moveable microelectromechanical mirror structure according to claim 1, wherein said microactuator further comprises a spring, said spring adapted to flex during selective thermal actuation of said microactuator.

4. A moveable microelectromechanical mirror structure according to claim 1, wherein said mirror is formed integrally with said microactuator from the single crystal material.

5. A moveable microelectromechanical mirror structure according to claim 1, further comprising a source of electromagnetic radiation directed along a path intersecting said mirror such that the path of electromagnetic radiation is thereby redirected by said mirror.

6. A moveable microelectromechanical mirror structure comprising:
   microelectronic substrate having a first major surface;
   a microactuator, disposed upon the first major surface of the microelectronic substrate and adapted for thermal actuation so as to controllably move along a predetermined path that extends substantially parallel to the first major surface of said microelectronic substrate; and
   a mirror, adapted for movement with said microactuator between a non-actuated position and an actuated position in response to thermal actuation, said mirror having a mirrored surface disposed out of plane relative to the first major surface of said microelectronic substrate in both the non-actuated position and the actuated position, wherein said microactuator and said mirror are formed from a single crystal 110 silicon wafer.

7. A moveable microelectromechanical mirror structure comprising:
   a microelectronic substrate having a first major surface;
   a microactuator, disposed upon the first major surface of the microelectronic substrate and adapted for thermal actuation so as to controllably move along a predetermined path that extends substantially parallel to the first major surface of said microelectronic substrate; and a mirror, adapted for movement with said microactuator between a non-actuated position and an actuated position in response to thermal actuation, said mirror having a mirrored surface disposed out of plane relative to the first major surface of said microelectronic substrate in both the non-actuated position and the actuated position, further comprising:

a mechanical latch affixed to the first major surface of said microelectronic substrate, said mechanical latch adapted to open in response to thermal actuation so as to receive said microactuator, said mechanical latch further adapted to close in response to the removal of thermal actuation and controllably clamp said microactuator in position once said mirror is in the actuated position.

8. A moveable microelectromechanical mirror structure according to claim 7, wherein said mechanical latch is further adapted to reopen in response to further thermal actuation so as to controllably unclamp and release said microactuator.

9. A method of redirecting electromagnetic radiation directed along at least one path using one or more moveable microelectromechanical mirror structures, each microelectromechanical mirror structure comprising a microelectronic substrate having a first major surface; a microactuator, disposed upon the first major surface of the microelectronic substrate and adapted for thermal actuation so as to controllably move along a predetermined path that extends substantially parallel to the first major surface of said microelectronic substrate; and a mirror, adapted for movement with said microactuator between a non-actuated position and an actuated position in response to thermal actuation, said mirror having a mirrored surface disposed out of plane relative to the first major surface of said microelectronic substrate in both the non-actuated position and the actuated position, the method of redirecting comprising the steps of:

providing at least one source of electromagnetic radiation directed along at least one path;

selectively thermally actuating at least one microactuator to controllably move along the predetermined path that extends substantially parallel to the first major surface of the microelectronic substrate;

controllably moving at least one mirror in response to thermal actuation of said at least one microactuator, wherein said controllably moving step comprises controllably moving each corresponding mirror from a non-actuated position in which the mirrored surface is out of plane relative to the first major surface of the microelectronic substrate to an actuated position in which one mirrored surface intersects said at least one path of electromagnetic radiation while remaining out of plane relative to the first major surface of the microelectronic substrate; and redirecting said at least one path of electromagnetic radiation intersected by said at least one mirror, wherein each microelectromechanical mirror structure further comprises a latch selected from the group consisting of a mechanical latch and an electrostatic latch, the method of redirecting further comprising the step of clamping said at least one microactuator in position using the latch following thermal actuation of said at least one microactuator such that the corresponding mirror is are held in position relative to said at least one path of electromagnetic radiation.

10. An optical switch comprising:

a microelectronic substrate having a surface;

a microactuator, disposed upon the surface of the microelectronic substrate and adapted for thermal actuation so as to controllably move along a path that extends substantially parallel to the surface of said microelectronic substrate; and a mirror, that is integral with the microactuator and protruding therefrom, the mirror being adapted for movement with said microactuator between a non-actuated position and an actuated position in response to thermal actuation of the microactuator, said mirror having a mirrored surface disposed out of plane relative to the surface of said microelectronic substrate in both the non-actuated position and the actuated position, wherein the mirror is planar in the actuated position and in the nonactuated position and said microactuator and said mirror are integral with one another and are an integrated unit of crystal 110 silicon.

* * * * *